US008904285B2

(12) United States Patent
Watanabe et al.

(10) Patent No.: US 8,904,285 B2
(45) Date of Patent: Dec. 2, 2014

(54) KEYWORD EXTRACTION APPARATUS AND PROGRAM

(75) Inventors: Nayuko Watanabe, Yokohama (JP); Masayuki Okamoto, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 435 days.

(21) Appl. No.: 13/428,170

(22) Filed: Mar. 23, 2012

(65) Prior Publication Data

US 2012/0210213 A1 Aug. 16, 2012

Related U.S. Application Data

(63) Continuation of application No. PCT/JP2009/066561, filed on Sep. 24, 2009.

(51) Int. Cl.
*G06F 17/00* (2006.01)
*G06F 17/27* (2006.01)
*G06F 17/21* (2006.01)

(52) U.S. Cl.
CPC ............. *G06F 17/214* (2013.01); *G06F 17/27* (2013.01)
USPC ............................ 715/277; 715/205; 715/256

(58) Field of Classification Search
None
See application file for complete search history.

(56) References Cited

FOREIGN PATENT DOCUMENTS

| JP | 2005-063283 A | 3/2005 |
|---|---|---|
| JP | 2006-215681 A | 8/2006 |
| JP | 2008-217333 A | 9/2008 |
| JP | 2009-037454 A | 2/2009 |
| JP | 2009-211385 A | 9/2009 |

OTHER PUBLICATIONS

English Translation of IPRP dated Apr. 19, 2012 from PCT/JP2009/066561; 5 pages.
International Search Report dated Nov. 24, 2009 from PCT/JP2009/066561.

*Primary Examiner* — Stephen Hong
*Assistant Examiner* — Keith Bloomquist
(74) *Attorney, Agent, or Firm* — Ohlandt, Greeley, Ruggiero & Perle, L.L.P.

(57) ABSTRACT

According to one embodiment, a keyword extraction apparatus includes a display, a first calculation unit, a scroll unit, a first generation unit, an extraction unit, a scoring unit and a second generation unit. The first calculation unit calculates a partial region indicating a part of the document displayed. The scroll unit scrolls the document to display other than the partial region in a document. The scoring unit calculates scores of the keywords in accordance with positions that the keywords occur within the document. The second generation unit generates a window for selecting the keywords in descending order of the scores from first keywords.

12 Claims, 23 Drawing Sheets

Initial Page View

| Display region before scrolling R_before | Empty |
| --- | --- |
| Display region after scrolling R | (0, 0, 480, 640) |

} 501

(e.g.) Scrolling down by 240 pixels

After Scrolling

| Display region before scrolling R_before | (0, 0, 480, 640) |
| --- | --- |
| Display region after scrolling R | (0, 240, 480, 640) |

} 501

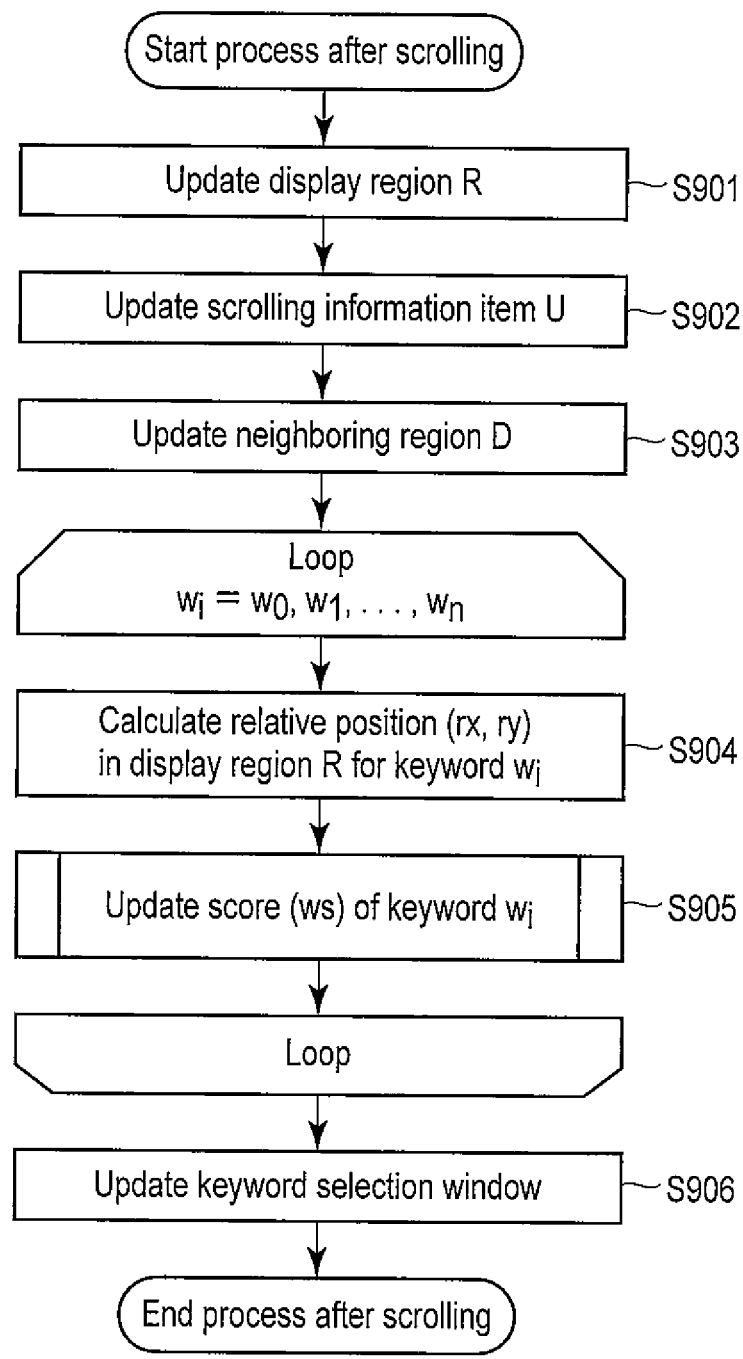
F I G. 9

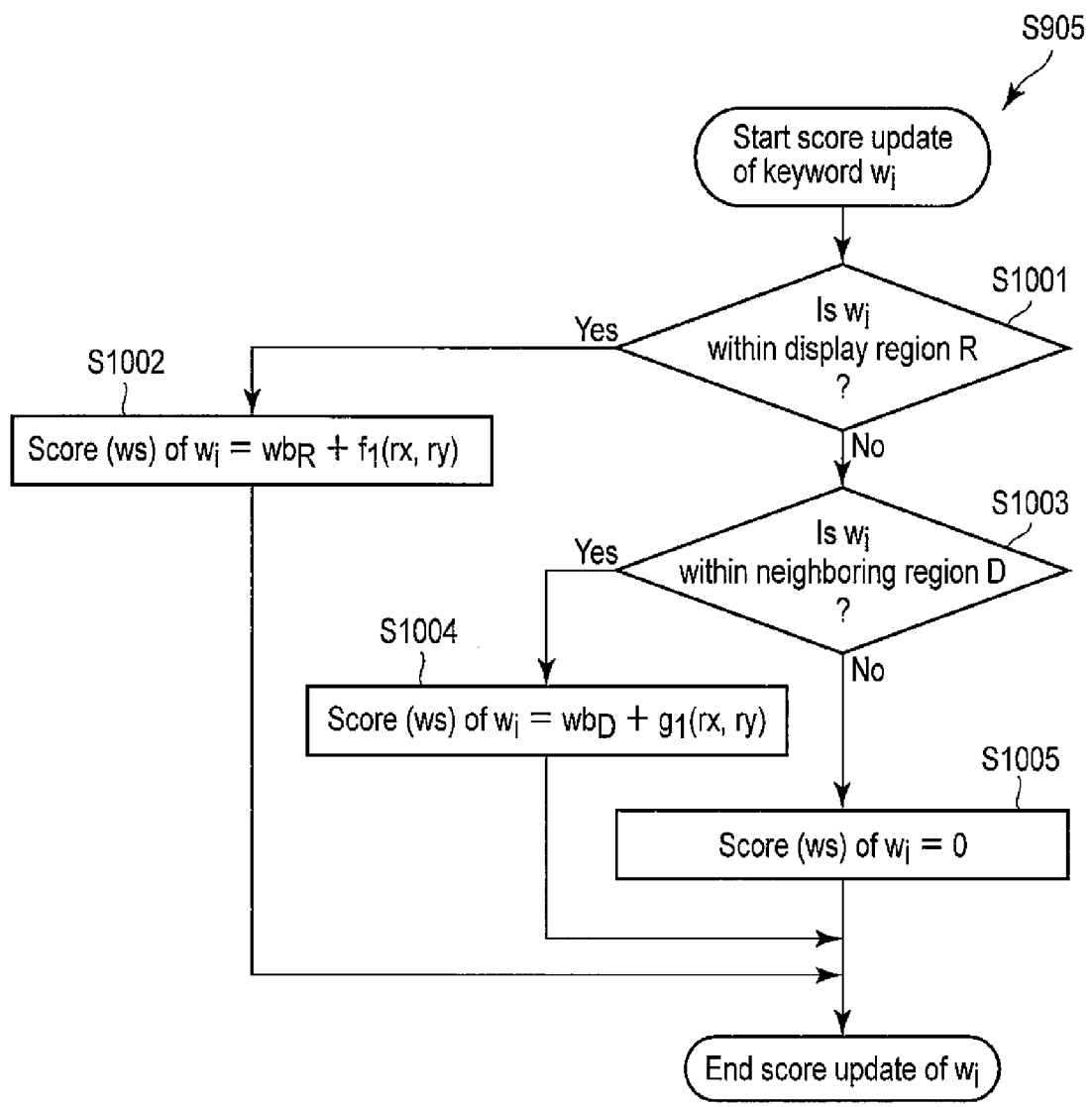
F I G. 10

Initial page view

Page view after scrolling

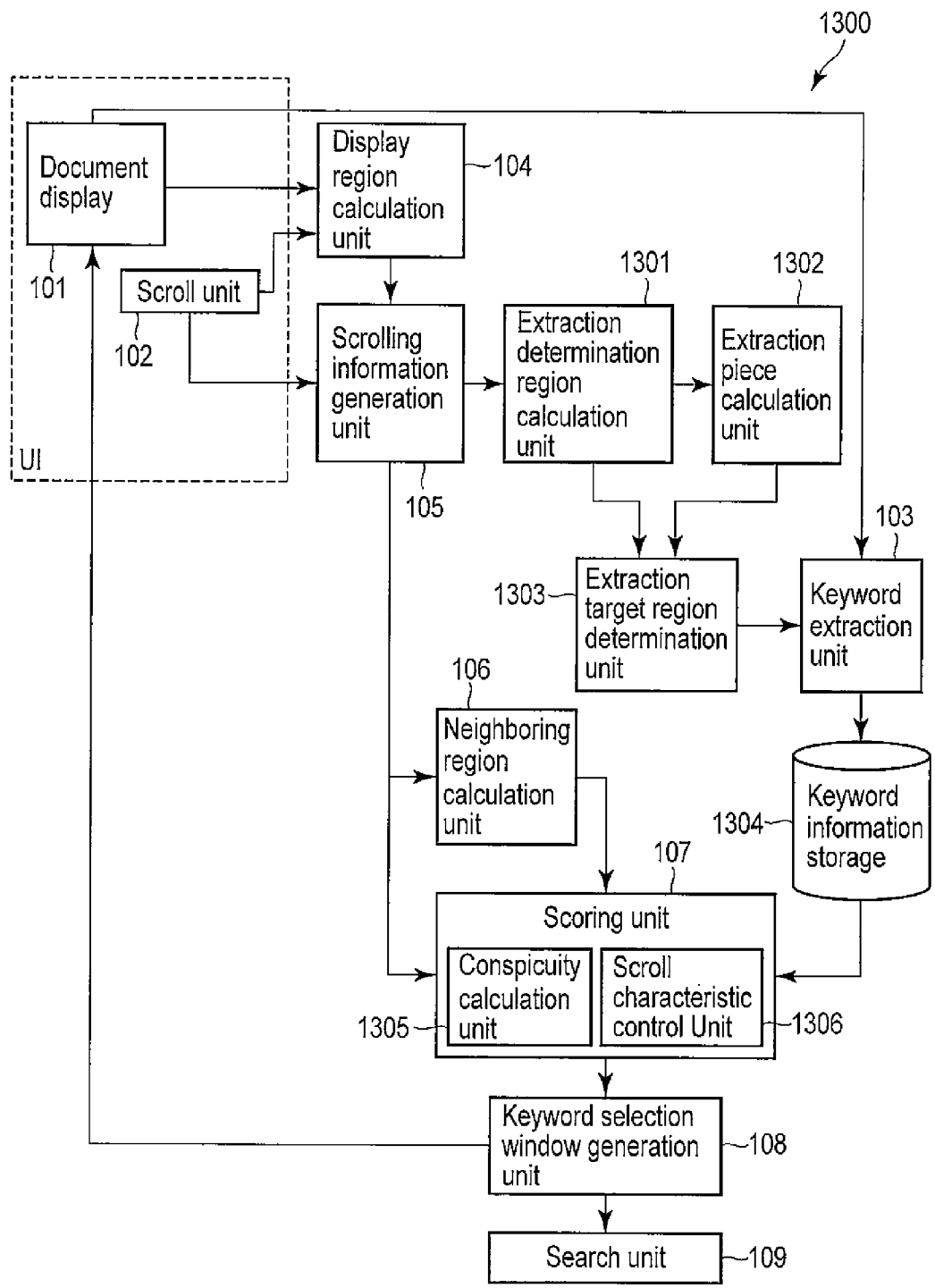
F I G. 13

Initial page view

| Display region before scrolling $R_{before}$ | Empty |
|---|---|
| Display region after scrolling R | (0, 0, 480, 640) |
| Scroll time t | 2009 · 06 · 16T12: 34: 50 |
| Scrolling speed v | (0, 0) pixel/sec |

} 1401

↓ (e.g.) Scrolling down by 240 pixels in 8 secs

After scrolling

| Display region before scrolling $R_{before}$ | (0, 0, 480, 640) |
|---|---|
| Display region after scrolling R | (0, 240, 480, 640) |
| Scroll time t | 2009 · 06 · 16T12: 34: 58 |
| Scrolling speed v | (0, 30) pixel/sec |

} 1401

F I G. 14

| ID | Word/phrase | Semantic attribute | Absolute position (px, py) | Relative position (rx, ry) in display region R | Score (ws) |
|---|---|---|---|---|---|
| 0 | Vegetable curry | Dish | 294, 69 | 294, −11 | 5.0 |
| 1 | Tomato | Ingredient | 174, 97 | 174, 17 | 15.0 |
| 2 | Onion | Ingredient | 276, 158 | 276, 78 | 20.0 |

Initial page view

Page view right after scrolling

KEYWORD EXTRACTION APPARATUS AND PROGRAM

CROSS-REFERENCE TO RELATED APPLICATIONS

This application is a Continuation application of PCT Application No. PCT/JP2009/066561, filed Sep. 24, 2009, the entire contents of which are incorporated herein by reference.

FIELD

Embodiments described herein relate generally to a keyword extraction apparatus and program.

BACKGROUND

Generally, there are many cases where a user wishes to search for a keyword that the user is interested in while browsing a page. However, on a device with a small screen such as a mobile device, it is not easy to select a keyword since a pointing device such as a mouse cannot be used. To solve this problem, there is a method of Web searching in which keywords are automatically extracted within the page being browsed, and then a list is presented so that the user can search with a keyword by selecting the keyword or selecting a command for the keyword (See, e.g., JP-A. No. 2008-217333 (KOKAI)).

BRIEF DESCRIPTION OF THE DRAWINGS

FIG. 9 is an exemplary flowchart illustrating the operation after scrolling according to the first embodiment.

FIG. 10 is an exemplary flowchart illustrating the score update operation according to the first embodiment.

FIG. 13 is an exemplary block diagram illustrating a configuration of a keyword extraction apparatus according to the second embodiment.

FIG. 14 illustrates an example of scrolling information item according to the second embodiment.

DETAILED DESCRIPTION

If keywords are extracted from the entire document, there is a case where a large number of keywords not shown in the document being browsed are extracted. To solve this problem, there is a way to extract keywords only within the displayed document. However, with this method, if a keyword that the user wishes to search for is off the window by scrolling, the user cannot search for the keyword.

In general, according to one embodiment, a keyword extraction apparatus includes a display, a first calculation unit, a scroll unit, a first generation unit, an extraction unit, a scoring unit and a second generation unit. The display is configured to display a document. The first calculation unit is configured to calculate a partial region indicating a part of the document displayed in the display. The scroll unit is configured to scroll the document to display other than the partial region. The first generation unit is configured to generate scrolling information item including a first position of a first display region and a second position of a second display region, the first display region being displayed before the scrolling, the second display region being to be displayed after the scrolling. The extraction unit is configured to extract one or more keywords in the document. The scoring unit is configured to calculate scores of the keywords in accordance with positions that the keywords occur within the document. The second generation unit is configured to generate a window for selecting at least one of the keywords in descending order of the scores from first keywords, occurring within a neighboring region, based on the scrolling information item.

In the following, the keyword extraction apparatus according to the present embodiments will be described in detail with reference to the drawings. In the embodiments described below, units specified by the same reference number carry out the same operation, and may only be explained once.

First Embodiment

Figure 1:
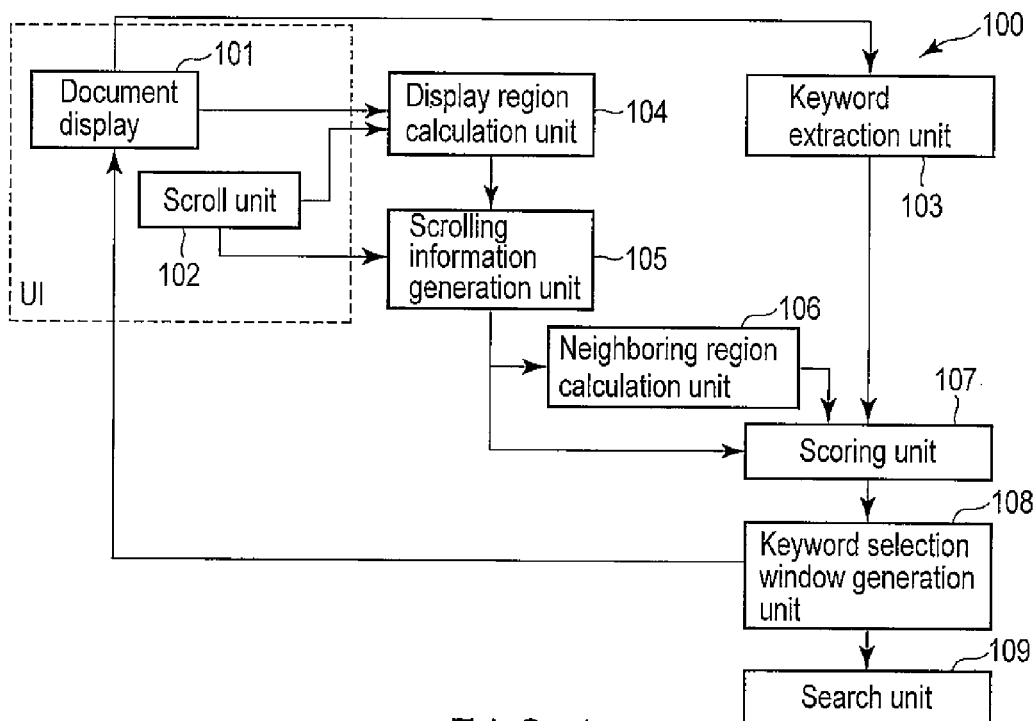
FIG. 1 is an exemplary block diagram illustrating a configuration of a keyword extraction apparatus according to the first embodiment.

A description of the keyword extraction apparatus according to the first embodiment with reference to FIG. 1 follows.

A keyword extraction apparatus 100 according to this embodiment includes a document display 101, a scroll unit 102, a keyword extraction unit 103, a display region calculation unit 104, a scrolling information generation unit 105, a neighboring region calculation unit 106, a scoring unit 107, a keyword selection window generation unit 108, and a search unit 109.

The document display 101 externally acquires, for example, a document (not shown) and displays it in a window. In the present embodiment, the document includes a web page, electric document (or text), a part of the document and the like.

The scroll unit 102 scrolls the document in accordance with a user's operation when the entire document cannot be shown within the window. The document display 101 and the scroll unit 102 may be called a user interface (UI). The scroll unit 102 may automatically scroll the document based on the externally received scrolling amount.

The keyword extraction unit 103 receives data regarding the size of display window from the document display 101, and extracts keywords within the currently viewable page, and keyword information items each indicating a semantic attribute and a position of each keyword.

The display region calculation unit 104 also receives the data indicating the size of window from the document display 101 and data indicating the size of scroll bar on the window from the scroll unit 102, and calculates a display region which is a region currently displayed in the document display 101. Concretely, the display region calculation unit 104 calculates the display region by relatively calculating the coordinates of the currently displayed region relative to the entire document. The display region will be explained in detail with reference to FIG. 4 later.

The scrolling information generation unit 105 receives the display region from the display region calculation unit 104, and receives the scrolling amount from the scroll unit 102. The scrolling information generation unit 105 generates scrolling information item indicating the display region before scrolling and the current display region.

The neighboring region calculation unit 106 receives the scrolling information item from the scrolling information generation unit 105, and calculates a neighboring region indicating a region outside the current display region in which keywords that the user may be interested in occur.

The scoring unit 107 receives the scrolling information item from the scrolling information generation unit 105, the keyword information items from the keyword extraction unit 103, and the neighboring region from the neighboring region calculation unit 106, and performs scoring to the extracted keywords based on the received data.

The keyword selection window generation unit 108 receives the scores from the scoring unit 107, and generates a window for selecting keywords based on the scores assigned to the keywords shown in the display region and the neighboring region.

The search unit 109 receives keywords from the keyword selection window generation unit 108, and searches for the keywords in accordance with the user's operation. Keyword searching may be performed, for example, by using a search engine or an external database (not shown).

An example of the user interface will be described in detail with reference to FIG. 2.

Figure 2:
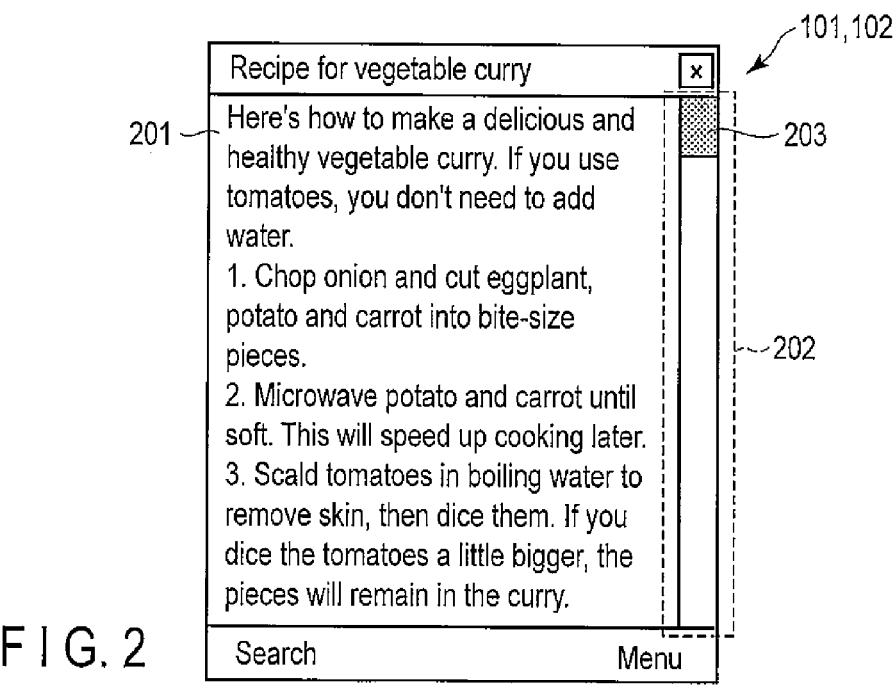
FIG. 2 illustrates an example of the user interface.

In FIG. 2, a scroll bar 202 is provided at the right side of a display window 201. The scroll unit 102 functions by the user moving a drag handle 203 of the scroll bar 202 up or down by means of buttons installed in an apparatus, for example. On an apparatus with a touch screen, the drag handle 203 can be moved directly by a pen or a finger. The document may be scrolled by sliding a pen or a finger over part of the screen in the desired direction.

The display region R is defined by the width $R_w$ and the height $R_h$ of the display window 201 of the document display 101. As shown in FIG. 2, in the case where the scroll bar 202 is shown in the window, the display region R is obtained by eliminating the scroll bar 202 from the display window 201, and the width $R_w$ and the height $R_h$ become smaller.

Figure 3:
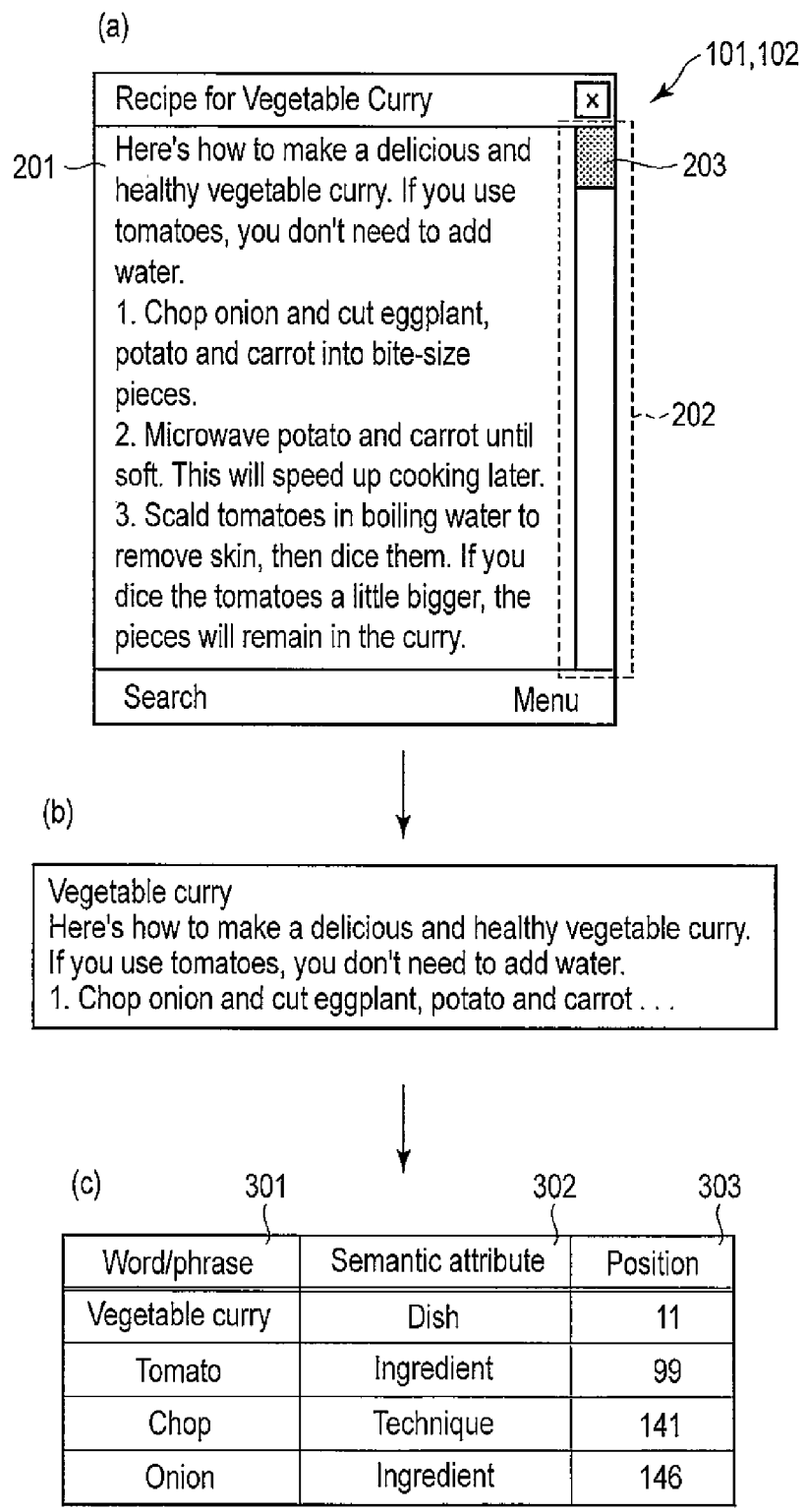
FIG. 3 illustrates examples of the browsed page, character string and keyword information items.

The keyword extraction processing, the keyword semantic attribute determination processing, and the keyword position calculation at the keyword extraction unit 103 will be described in detail with reference to FIG. 3. FIG. 3 (a) shows a currently viewable page in the user interface, FIG. 3 (b) shows character strings in which keywords will be extracted, and FIG. 3 (c) is a table of keyword information items obtained as a result of the keyword extraction processing.

Keywords can be extracted by using a method of extracting a noun phrase by using the conventional technology of morphological analysis. The semantic attribute of keyword can be determined by using the conventional proper expression extraction method based on dictionaries or rules.

For example, if a rule that a character string including "corporation" is determined as "company name" is used, a keyword or collocation including "corporation" is determined as "company name" by the keyword semantic attribute determination processing.

In this embodiment, when the document display 101 initially displays a document, the text is extracted from other than character for markup. In FIG. 3, the text except the buttons of "search" and "menu" shown in FIG. 3 (a) is extracted as shown in FIG. 3 (b). The table of keyword information items shown in FIG. 3 (c) is obtained by performing the semantic attribute determination processing to the text shown in FIG. 3 (b). In the table of keyword information items, word/phrase 301, semantic attribute 302 and position 303 are associated with each other. For example, for "vegetable curry," the semantic attribute 302 is "dish," and the position 303 is "0." For "tomato," the semantic attribute 302 is "ingredient," and the position 303 is "31." The position 303 represents the position counting from the head of the character string, but may be the absolute position in the entire document as described later. The position 303 can be determined in any appropriate way.

Figures 4, 5:
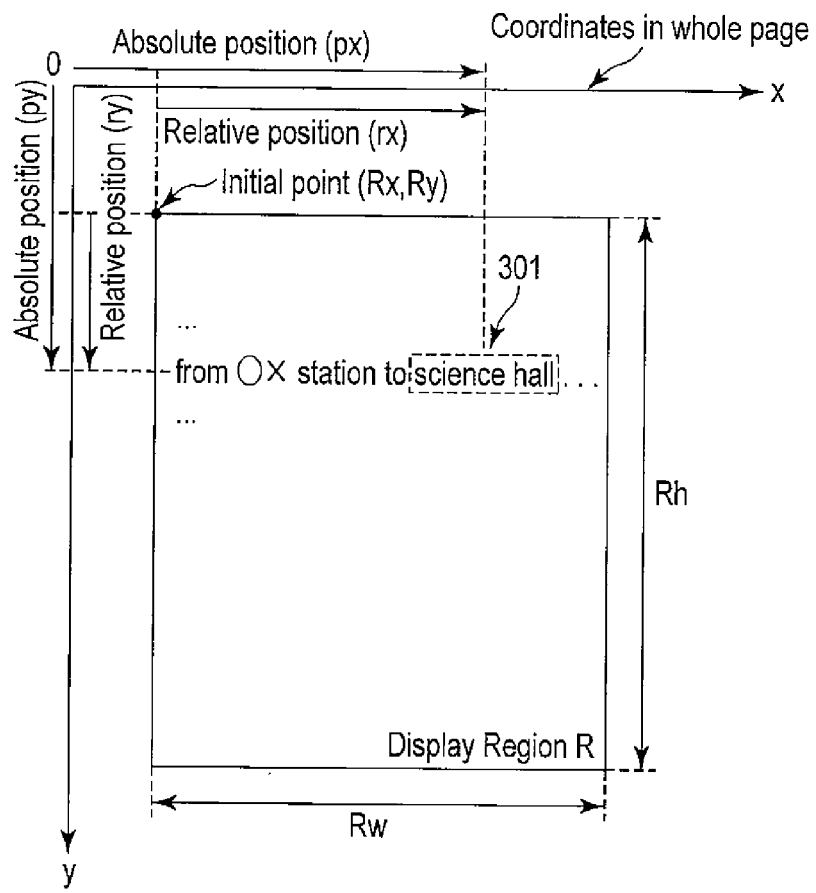
FIG. 4 illustrates a schematic diagram of the relative position of a keyword.
FIG. 5 illustrates an example of the scrolling information item according to the first embodiment.

The relative position of a certain keyword within the display region R will be explained in detail with reference to FIG. 4.

The relative position (rx, ry) represents a point at the middle of a box enclosing a keyword from a point $(R_x, R_y)$ (initial point) at the upper left corner of the display region R. For example, in FIG. 4, the point (absolute position) at the middle of the box enclosing "science hall" from the origin "0" is represented as (px, py), and (rx, ry) is represented as (px-$R_x$, py-$R_y$). The absolute position (px, py) can be obtained by using the function of the Document Object Model (DOM) if the browsed document is a web page.

The initial point $(R_x, R_y)$ of the display region R after scrolling is determined by the scrolling amount defined by the scroll unit 102. For example, if the amount of a single scroll is represented by $(S_x, S_y)$, and the current scrolled position is $(S_x, S_y)$, the initial position $(R_x, R_y)$ of the display region R is equal to $(S_x, S_y)$. After another scroll is performed, the initial position $(R'_x, R'_y)$ of the display region R is equal to $(S_x+R_x, S_y+R_y)$. The display region calculation unit 104 updates the display region R every time the user scrolls down the document.

An example of scrolling information item generated by the scrolling information generation unit 105 will be described in detail with reference to FIG. 5.

The scrolling information generation unit 105 generates scrolling information item U 501 indicating the display region $R_{before}$ indicating the coordinates of the display region before scrolling and the display region R indicating the coordinates of the current display region after scrolling, in accordance with the user's scrolling.

On the initial page view, no scrolling has been performed, and the display region $R_{before}$ has no data (empty). The current display region R is calculated by the display region calculation unit 104. In FIG. 5, the current display region R on the initial page view is (0, 0, 480, 640). The four parameters of the display region R include the initial position ($R_x$, $R_y$), the width $R_w$ and the height $R_h$. In FIG. 5, the initial position ($R_x$, $R_y$) on the initial page view is (0, 0).

For example, the scrolling information item U 501 after scrolling the page by 240 pixels (in the positive direction of the y-axis) indicates the display region $R_{before}$ is (0, 0, 480, 640), and the current display region R is (0, 240, 480, 640). The display region $R_{before}$ indicates the display region before scrolling. The amount of one scroll is obtained by comparing the display region $R_{before}$ with the current display region R.

The neighboring region D will be described below. In the present embodiment, the neighboring region D is a rectangular region. The neighboring region D is equal to the display region R on the initial page view of the document display 101.

When the user scrolls the document, the neighboring region calculation unit 106 updates the neighboring region D so as to include the display region $R_{before}$ and the current display region R by referring to the scrolling information item U. For example, in FIG. 5, the scrolling information item U 501 after scrolling shows that the display region $R_{before}$ is (0, 0, 480, 640), and the current display region R is (0, 240, 480, 640). Comparing the display region $R_{before}$ with the current display region R, it is shown that the document is scrolled down by 240 pixels. The height of the neighboring region D is 880 which is obtained by adding the scrolling amount of 240 to the height of the display region $R_h$ of 640. The neighboring region D which includes the display region $R_{before}$ and the current display region R is (0, 0, 480, 880).

The neighboring region D is not limited to a rectangular region, and may be a region including multiple rectangles or a region which is not a rectangle. For example, the neighboring region D may be the smallest convex polygon including the display region $R_{before}$ and the current display region R.

An example of scoring method will be explained in detail with reference to FIG. 6.

Figure 6:
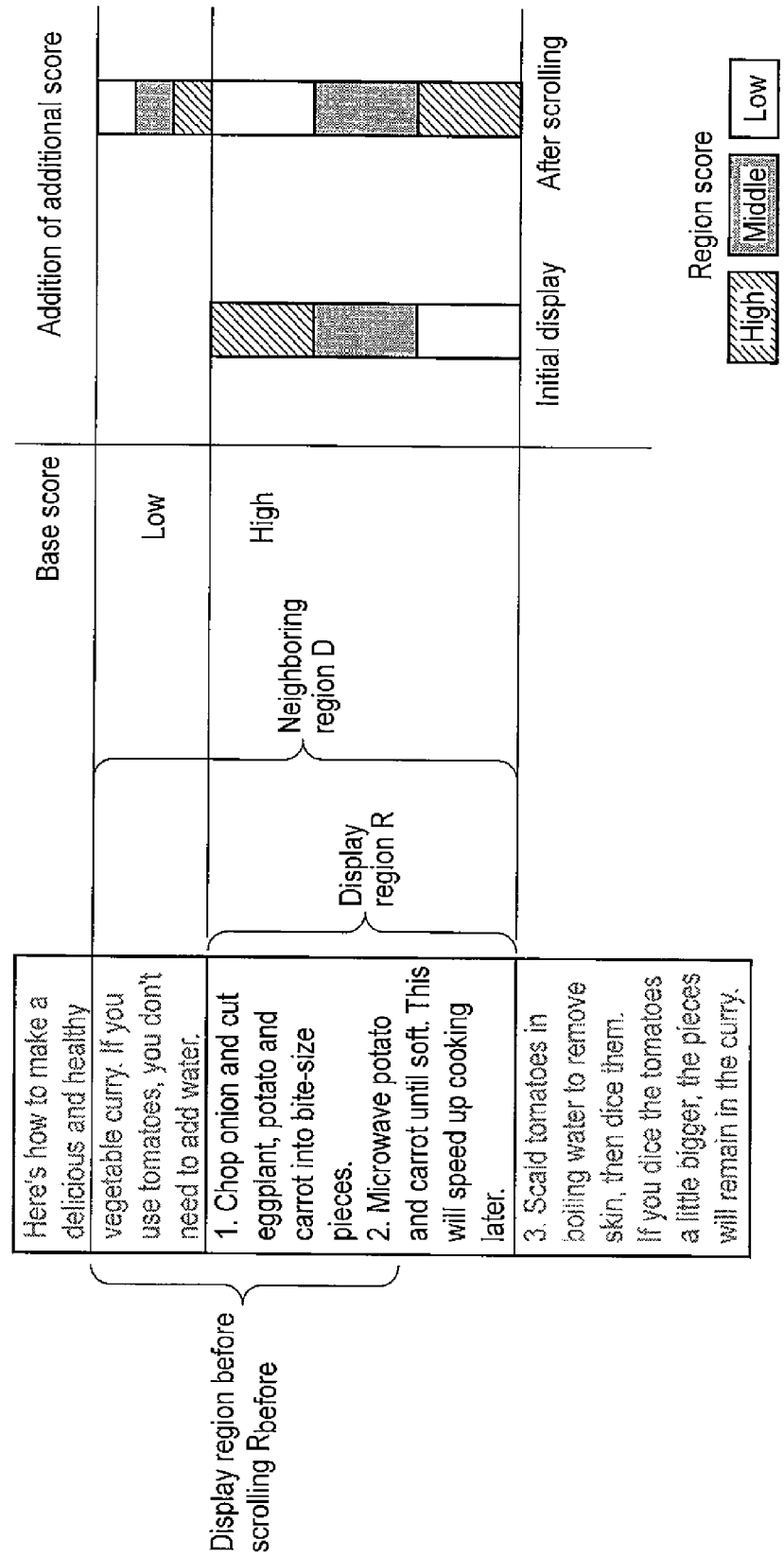
FIG. 6 illustrates an example of the scoring method according to the first embodiment.

In FIG. 6, the direction of scrolling is limited to vertical for simplification. However, scoring can be performed in horizontal or diagonal scrolling in the same manner.

First, the base score of a keyword within the display region R is set to be higher than that outside the display region R since the user's interest may be higher in the current display region R. With reference to the base score, an additional score is added to each keyword in accordance with the relative position.

On the initial page view, the keywords located in the higher positions will be assigned higher additional scores, and keywords outside the current display region R are set to zero, since the user usually reads the page from the top.

After scrolling the document, higher additional scores are added to the keywords located in the lower positions of the display region R, since the user usually pays more attention to newly shown text. The additional scores of keywords outside the display region R but within the neighboring region D are decreased in accordance with the distance away from the display region R since the user's interest may be lower for the text away from the display region R as the user continues to read. The detailed scoring process will be described with reference to the flowchart of FIG. 8.

Figure 7:
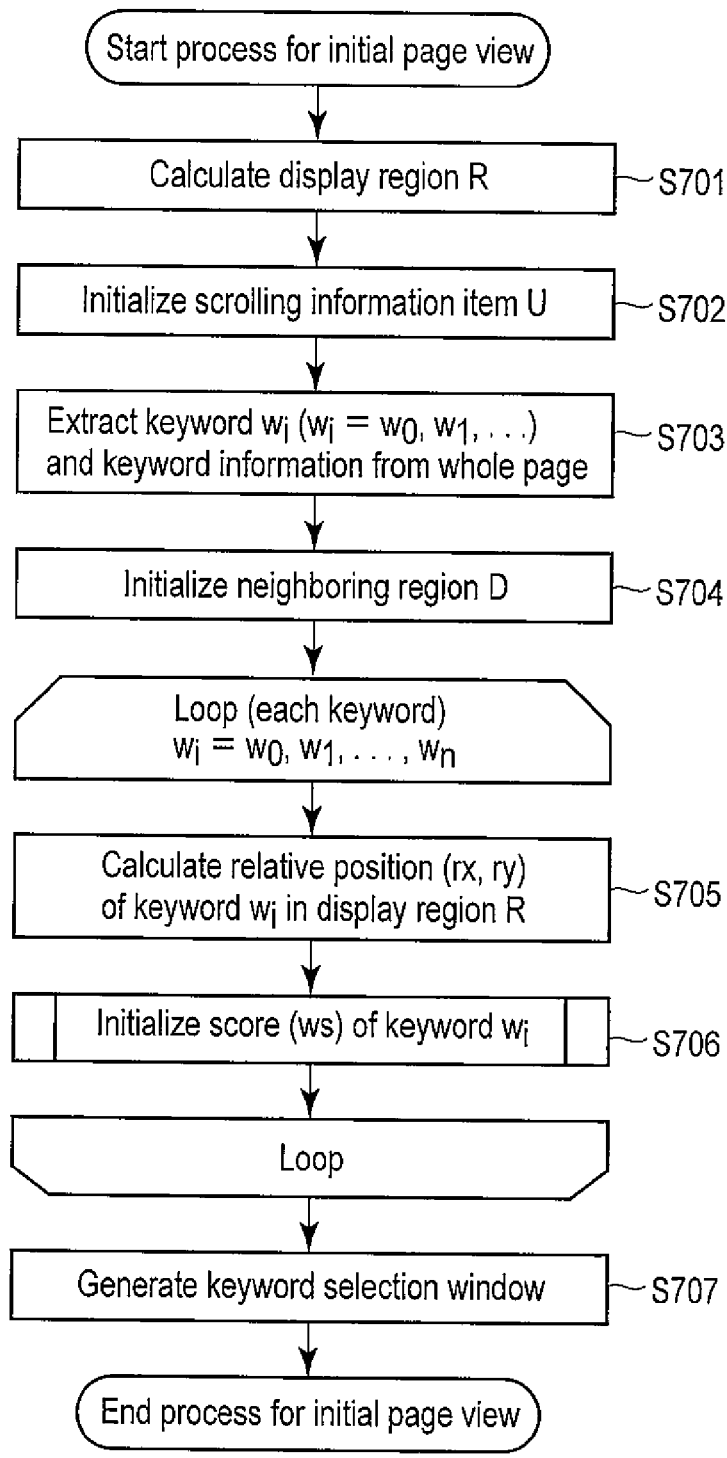
FIG. 7 is an exemplary flowchart illustrating the operation at the time of initially displaying a document according to the first embodiment.

The operation of the keyword extraction apparatus according to the first embodiment at the time of initially displaying the document will be described with reference to the flowchart of FIG. 7.

In step S701, the display region calculation unit 104 calculates the display region R.

In step S702, the scrolling information generation unit 105 initializes the scrolling information item U.

In step S703, the keyword extraction unit 103 extracts keywords from the whole page, and obtains keyword information item for each keyword which includes the absolute position (px, py) and the semantic attribute.

In step S704, the neighboring region calculation unit 106 initializes the neighboring region D to be the same as the display region R.

In step S705, the scoring unit 107 calculates the relative position (rx, ry) in the display region R for a keyword $w_i$.

In step S706, the scoring unit 107 calculates the initial score of keyword $w_i$ based on the calculated relative position (rx, ry). The calculation of the initial score will be described with reference to FIG. 8 later.

Step S705 and step S706 are executed for all extracted keywords.

In step S707, the keyword selection window generation unit 108 generates a keyword selection window. The operation at the time of initially displaying the document is completed.

The calculation of the initial score in step S706 shown in FIG. 7 will be described in detail with reference to the flowchart of FIG. 8.

In step S801, the scoring unit 107 determines whether or not the keyword $w_i$ is within the display region R. If the keyword $w_i$ is within the display region R, step S802 is executed. If $w_i$ is not within the display region R, step S803 is executed.

In step S802, the scoring unit 107 calculates the initial score of the keyword $w_i$. The initial score ws is given by $$ws = wb_R + f_0(rx, ry), \quad (1)$$

where $wb_R$ is the base score in the display region R, and $f_0$(rx, ry) is a function for assigning additional scores to divided display region R. The function of $f_0$(rx, ry) is given by $$f_0(rx, ry) = \begin{cases} a & (ry < R_h/3) \\ b & (R_h/3 \le ry \le 2 \cdot R_h/3) \\ c & (2 \cdot R_h/3 < ry) \end{cases} \quad (2)$$

$$(a > b > c > 0).$$

The function of $f_0$(rx, ry) is also given by any appropriate equation using the relative position (rx, ry), such as $$f_0(rx, ry) = a \cdot rx + b \cdot ry + c. \quad (3)$$

In step S803, the initial score of the keyword $w_i$ is set to zero since the keyword $w_i$ is not within the display region R.

The operation of the keyword extraction apparatus according to the first embodiment after scrolling the document will be described with reference to the flowchart of FIG. 9.

In step S901, the display region calculation unit 104 updates the display region R.

In step S902, the scrolling information generation unit 105 updates the scrolling information item U. In step S903, the neighboring region calculation unit 106 updates the neighboring region D.

In step S904, the scoring unit 107 calculates the relative position (rx, ry) in the display region R for the keyword $w_i$. In step S905, the scoring unit 107 updates the score of keyword $w_i$. Steps S904 and S905 are executed for all extracted keywords. The operation of updating score will be described later with reference to FIG. 10.

In step S906, the keyword selection window generation unit 108 updates the keyword selection window in accordance with the updated score.

The operation of updating score will be described with reference to the flowchart of FIG. 10. For simplification, score calculation will be explained only based on a vertical scroll, but can be performed for a horizontal or diagonal scroll in the same manner.

In step S1001, the scoring unit 107 determines whether or not the keyword $w_i$ is within the display region R. If the keyword $w_i$ is within the display region R, step S1002 is executed. If $w_i$ is not within the display region R, step S1003 is executed.

In step S1002, the scoring unit 107 calculates the updated score of the keyword $w_i$. The updated score ws is given by $$ws = wb_R + f_1(rx, ry). \quad (4)$$

The equations (2) and (3) can be applied to the function $f_1(rx, ry)$. The constants are set to 0<a<b<c so that higher additional scores are assigned to keywords located in the lower positions of the display region R.

In step S1003, the scoring unit 107 determines whether the keyword $w_i$ is located within the neighboring region D outside the display region R. If the keyword $w_i$ is located within the neighboring region D outside the display region R, step S1004 is executed, and if not, step S1005 is executed.

In step S1004, the updated score of the keyword $w_i$ is calculated in the same way in step S1002. The updates score ws is given, for example, by $$ws = wb_D + g_1(rx, ry), \quad (5)$$

where $wb_D$ is the base score in the neighboring region D, and $g_1(rx, ry)$ is given in the same way as in equations (2) and (3).

In step S1005, the updated score of the keyword $w_i$ is set to zero since the keyword $w_i$ is not within the display region R and the neighboring region D.

An example of the selection window generated by the keyword selection window generation unit 108 will be described with reference to FIGS. 11A and 11B.

Figure 11A:
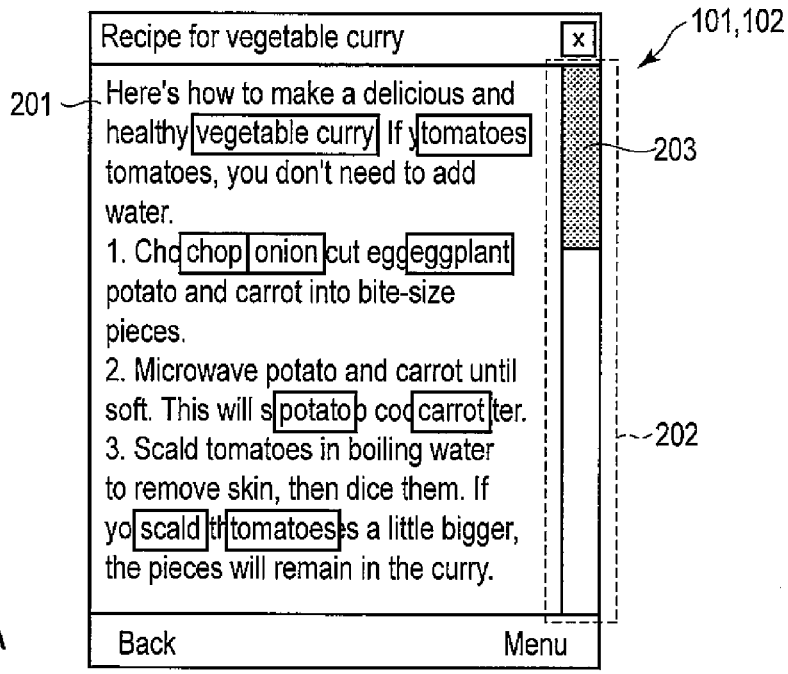
FIG. 11A illustrates an example of the keyword selection window on the initial page view.

As shown in FIG. 11A, on the initial page view, keywords shown in the display region R are highlighted in the document display 101. The keywords can be indicated as buttons so that the user can easily notice that the keywords are selectable. The highlight colors of keywords may be changed in accordance with the scores to emphasize keywords having higher scores.

Figure 11B:
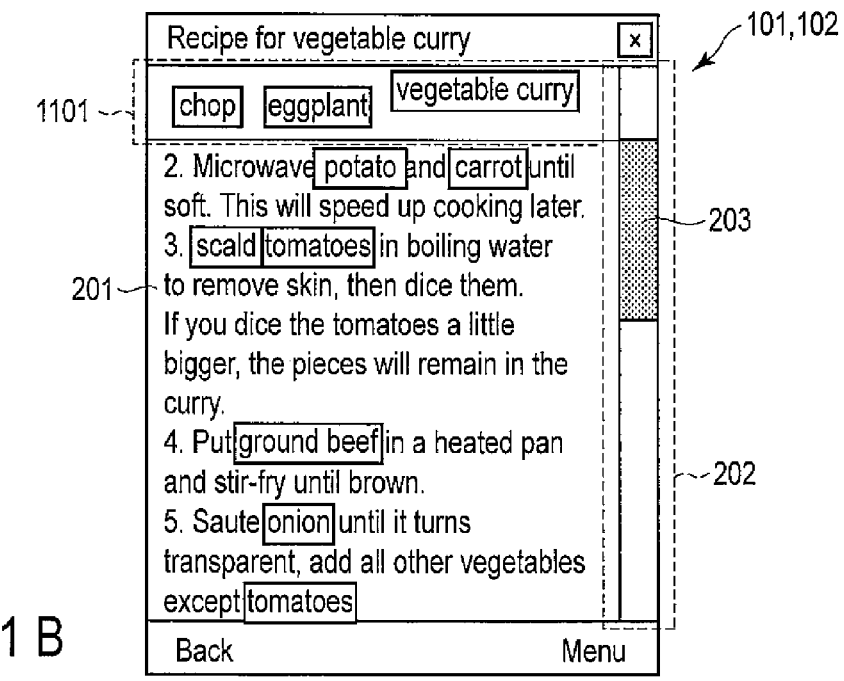
FIG. 11B illustrates an example of the keyword selection window after scrolling.

FIG. 11B shows an example of keyword selection window after scrolling. The keywords shown in the display region R are highlighted in the document display 101 as same as FIG. 11A. The keywords shown in the neighboring region D (neighboring keywords) are displayed in a neighboring keyword display region 1101. The neighboring keyword display region 1101 is a separate window from the display region R, and provided at the top or the bottom of the document display 101. In the neighboring keyword display region 1101, not all neighboring keywords are displayed, but only N keywords having the highest scores (N is a natural number) are displayed. The keywords may be arranged in a horizontal line, or arranged close relation to the original text as shown in FIG. 11B.

On the initial page view, it is not necessary to display the neighboring keyword display region 1101 since the neighboring region D is the same as the display region R. The keywords may be always highlighted, but may be highlighted only when the user presses a search button.

For the case where the user may select a keyword by using cursor buttons or by touching the screen on the keyword selection window, a command for the keyword can be selected from a drag down menu by the user's operation.

Figure 12:
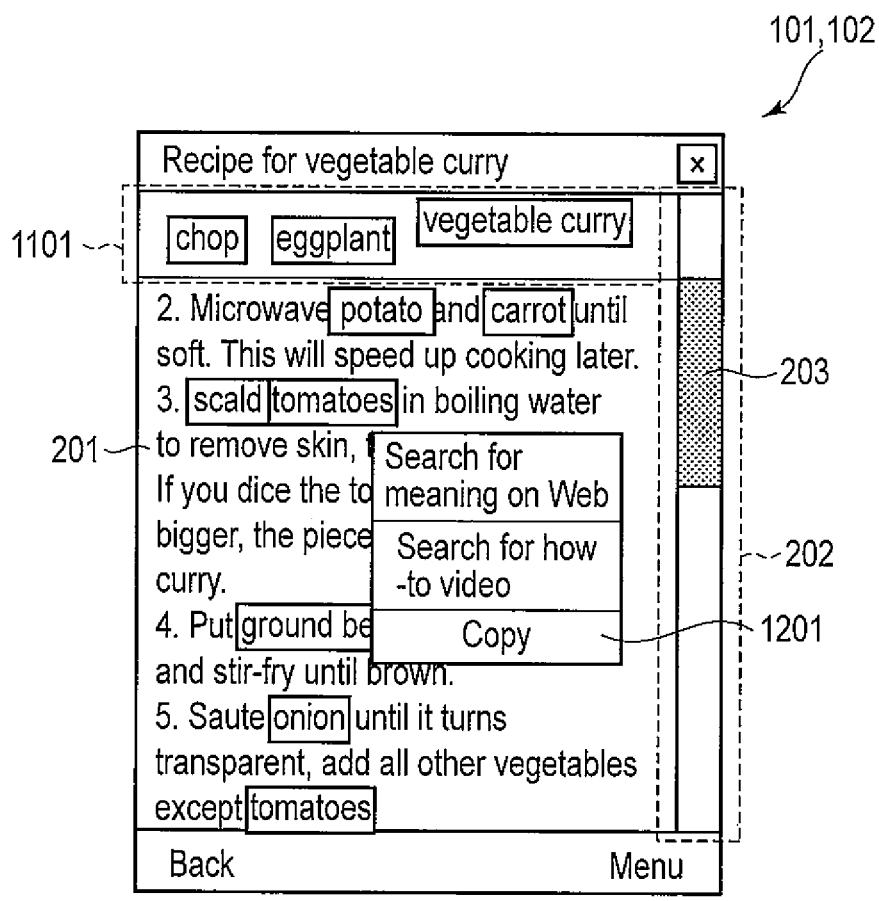
FIG. 12 illustrates an example of selecting a command regarding a keyword from the menu window.

FIG. 12 shows an example of window for selecting a command for a keyword by the user's operation.

A drag down menu 1201 is generated in accordance with the semantic attribute of the selected keyword. As shown in FIG. 12, the drag down menu 1201 may include a command to search for a how-to video in addition to a command to search the Web for "scald" whose semantic attribute is "technique." The drag down menu for "vegetable curry" whose semantic attribute is "dish" may include a command to search for restaurants for vegetable curry.

In accordance with the first embodiment, keyword extraction is performed not only for the current document but also for the part of the document which is no longer on screen but which, on the basis of the user's scrolling, the user may be interested in, so that sufficient keywords can be presented to the user, and the user can easily and efficiently select a desired keyword.

Second Embodiment

In the first embodiment, keyword extraction is performed for all documents, and the number of keywords will be large for a large site (a number of documents). For such keyword extraction, it takes longer to become ready for the user's keyword selection. The second embodiment is different from the first in that keyword extraction is performed only for required parts of all documents.

In addition, the second embodiment is different from the first in that time data is added to scrolling information item in accordance with the elapsed time after the user's scrolling, and the scores of keywords are updated in accordance with the scrolling amount and time between scrolls.

A description of the keyword extraction apparatus according to the second embodiment with reference to FIG. 13 follows.

A keyword extraction apparatus 1300 according to the second embodiment includes an extraction determination region calculation unit 1301, an extraction piece calculation unit 1302, an extraction target region determination unit 1303, and a keyword information storage 1304 in addition to the keyword extraction apparatus 100 of the first embodiment. The scoring unit 107 of keyword extraction apparatus 1300 also includes, a conspicuity calculation unit 1305, and a scroll characteristic control unit 1306.

The extraction determination region calculation unit 1301 receives scrolling information item from a scrolling information generation unit 105, and calculates an extraction determination region C. The extraction determination region C is a region for determining whether additional keyword extraction is necessary, and is set to be larger than a display region R. The extraction determination region C is required for extracting keywords in advance in a region which may be viewed next by the user. The size of the extraction determination region C is determined at the time of initially displaying the document, and the region is updated in accordance with the user's scroll.

The extraction piece calculation unit 1302 receives the extraction determination region C from the extraction determination region calculation unit 1301, and calculates an extraction piece region (extraction piece) $I_i$ (i is a positive integer). Calculation of extraction pieces is completed at the time of initially displaying the document.

The extraction target region determination unit 1303 receives the extraction determination region C from the extraction determination region calculation unit 1301 and the extraction piece from the extraction piece calculation unit 1302, and determines whether the extraction determination region C overlaps an extraction piece in which keyword extraction has not been performed. If the extraction determination region C overlaps an extraction piece in which keyword extraction has not been performed, an instruction to perform keyword extraction for the corresponding extraction piece is made to the keyword extraction unit 103.

The keyword information storage 1304 receives keywords from the keyword extraction unit 103, and stores IDs of extracted keywords, the semantic attributes, the absolute position in the document, the relative position in the current display region R, and the scores as keyword information items. The extracted keywords may be stored in the keyword information storage 1304 every time the keyword extraction unit 103 extracts keywords, or may be stored in the keyword information storage 1304 after the keyword extraction for each extraction piece is completed. The keyword information items to be stored in the keyword information storage 1304 will be explained in detail with reference to FIG. 16 later.

The conspicuity calculation unit 1305 calculates conspicuity value of each keyword based on the text color, background color, size and design, and adds additional scores. The conspicuity value is an index indicating how eye-catching a keyword is. For example, the conspicuity value is given by $a \times V_{diff} \times Size \times Length$ (a is a constant), where $V_{diff}$ represents the difference in brightness between the text color of a keyword and the background color, Size represents the font size, and Length represents the length of keyword. The conspicuity value may be added to the keyword information items.

The scroll characteristic control unit 1306 adds a additional score to a keyword based on the position of selected keyword (target keyword) on the initial page view and the history of the scrolling information item. For example, if in many cases, the scrolling speed v of the previous scrolling information item U is a predetermined value $v_{th}$ with or more, and the relative position of the selected keyword in the y-axis ry is often in the lower part of the display region (for example, $2 \times R_h / 3$), it is assumed that if the scrolling speed v is high, the user may be interested in the lower part of the display region. Additional scores are added to keywords in the lower part of the display document if the scrolling speed v is high.

The scrolling information item generated by the scrolling information generation unit 105 according to the second embodiment will be explained in detail with reference to FIG. 14.

The scrolling information item U 1401 includes the display region before scrolling $R_{before}$, the current display region R, the time of completing scroll t, and the scrolling speed v ($v_x$ represents the scrolling speed in the x-axis, $v_y$ represents the scrolling speed in the y-axis). The scrolling speed v indicates the number of pixels the display region moves in the x- and y-axes in one second. The time t represents the time when the initial page is displayed for the initial page view. Since the scrolling speed v is given based on movement in the x- and y-axes, the scrolling speed in the horizontal or diagonal direction can be calculated in addition to the speed in the vertical direction.

On the initial page view, no scrolling has been performed, and the display region $R_{before}$ has no data (empty). In FIG. 14, the current display region R on the initial page view is (0, 0, 480, 640). The scroll time t indicates "06/16/2009 T12:34:50," and the scrolling speed v is zero both in the x- and y-axes.

The case where the document is scrolled by 240 pixels for eight seconds (240 pixels down in the positive direction of the y-axis) will be explained. The display region $R_{before}$ is the same as the display region on the initial page view, and represents (0, 0, 480, 640). The current display region R after 240-pixel scroll is (0, 240, 480, 640) in which the initial position $R_y$ is changed. The scroll time t represents the time of completion of the scroll, "06/16/2009 T12:34:58." The scrolling speed v is calculated by the time from when the scroll is started (when the initial page is displayed for the initial page view) to when the scroll is completed and the scrolled pixels. In this case, since the document is scrolled by 240 pixels in the positive direction of the y-axis for eight seconds, the scrolling speed v is (0, 30) pixels/second.

The scrolling information item U 1401 may include the last scrolling amount S instead of the display region $R_{before}$, and the scrolling start time $t_{start}$ instead of the scrolling speed v.

Figures 15, 16:
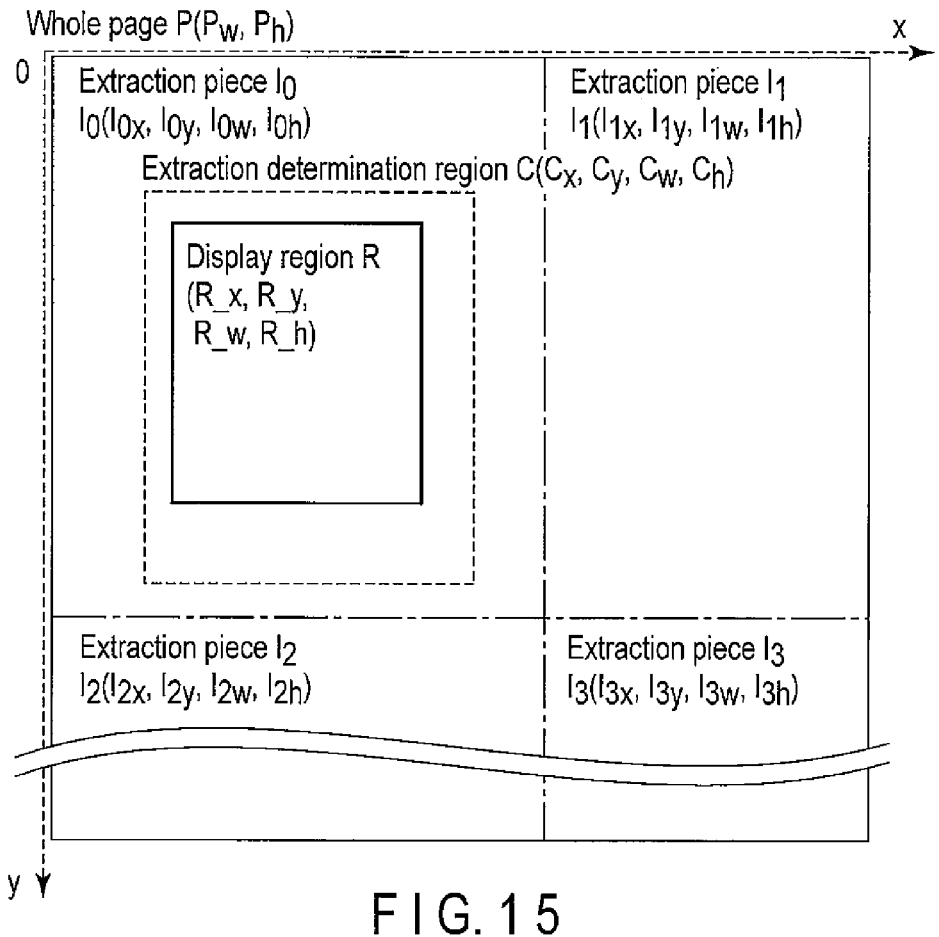
FIG. 15 illustrates schematic diagram of the extraction piece and extraction determination region.
FIG. 16 illustrates an example of keyword information items according to the second embodiment.

The extraction determination region C will be explained in detail with reference FIG. 15.

The whole document is represented by ($P_w$, $P_h$) where $P_w$ indicates the width and $P_h$ indicates the height. The whole document is divided into one or more extraction pieces. In FIG. 15, the whole document P is divided into four extraction pieces $I_i$ (i=0, 1, 2, 3). Each extraction piece $I_i$ is defined by four parameters including the initial position $I_{ix}$, $I_{iy}$, the width $I_{iw}$ and the height $I_{ih}$ as same as the display region R. For example, an extraction piece has a 1000 width and a 1500 height, the extraction piece $I_0$ is represented as ($I_{0x}$, $I_{0y}$, $I_{0w}$, $I_{0h}$)=(0, 0, 1000, 1500). The extraction piece $I_2$ is represented as ($I_{2x}$, $I_{2y}$, $I_{2w}$, $I_{2h}$)=(0, 1500, 1000, 1500).

The extraction determination region C is set to be larger than the display region R to perform keyword extraction by taking the user's scroll into consideration.

An example of keyword information items stored in the keyword information storage 1304 will be explained in detail with reference to FIG. 16.

The keyword information item for each keyword includes an ID, a word/phrase 301, a semantic attribute 302, an absolute position 1601 (px, py) which are not changed after extraction, a relative position 1602 (rx, ry) in the display region R which is updated every time the user scrolls the document, and a score 1603 (ws) which is updated by periodical score update process which is described below. If the keyword extraction unit 103 extracts an keyword which has not been stored in the keyword information storage 1304, the extracted keyword and the corresponding keyword information item are stored in the keyword information storage 1304. For example, for "vegetable curry" whose ID is "zero," the semantic attribute 302 represents "dish," and the absolute position 1601 (px, py) represents "294, −11." The data in word/phrase 301, semantic attribute 302, and absolute position 1601 are not changed after extraction. The relative position 1602 (rx, ry) in the display region R represents "294, −11" which is updated for each scroll, and the score 1603 (ws) represents "5.0" which is periodically updated by score update process. The value of ry is a negative value since the display region R moves down by 80 pixels (in the positive direction of the y-axis shown in FIG. 5) from the initial page view, and the character string of "vegetable curry" is off the display region R.

Figure 17:
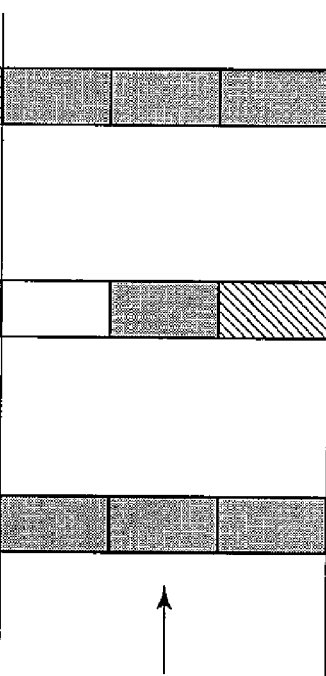
FIG. 17 illustrates an example of the scoring method according to the second embodiment.

An example of scoring method according to the second embodiment will be explained in detail with reference to FIG. 17.

As same as FIG. 6, the direction of scrolling is limited to the vertical for simplification. As same as the first embodiment, the base scores for keywords within the display region R are set to be higher than those outside the display region R but within the neighboring region D.

The method for scoring a keyword within the display region R at the time of initially displaying a document or right after scrolling the document is the same as that of the first embodiment. However, the same score is added to each keyword within the display region R when a predetermined time has elapsed after initially displaying the document or scrolling the document. The time of initially displaying a document indicates a predetermined period after completion of initial display of the document, and the time of right after scrolling the document indicates a predetermined period after completion of scroll of the document.

The same score is added to each keyword outside the display region R but within the neighboring region D right after scrolling the document. After a predetermined time has elapsed after scrolling, higher additional scores are assigned to keywords located closer to the display region R. Since the keywords located outside the display region R were displayed before scrolling, the user seems to be interested in the keywords regardless of the distance from the display region R right after scrolling; however, the user's interest will be lower for the keyword away from the display region R after a predetermined time has elapsed.

Figure 18:
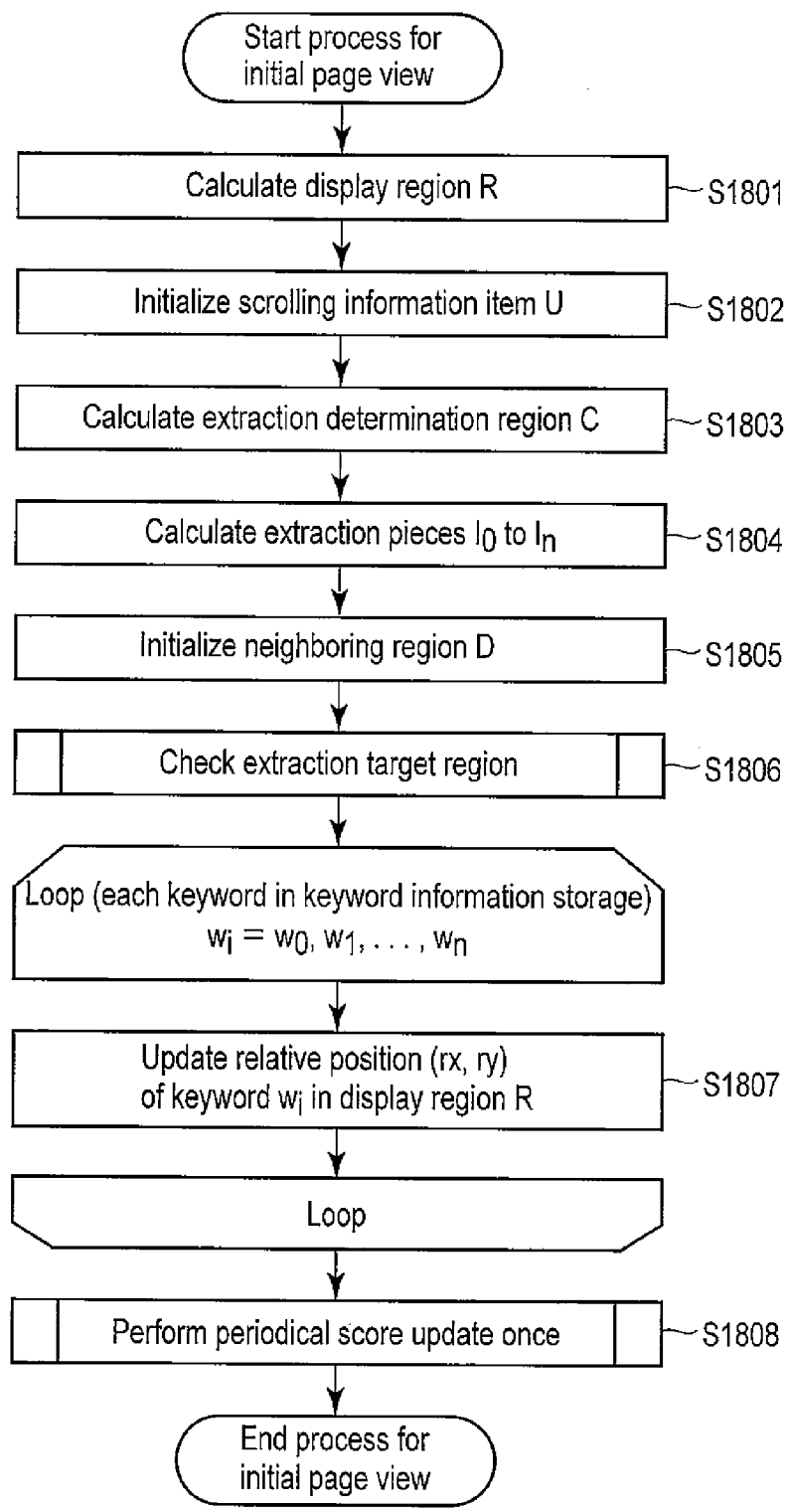
FIG. 18 is an exemplary flowchart illustrating the operation at the time of initially displaying a document according to the second embodiment.

The operation of the keyword extraction apparatus according to the second embodiment at the time of initially displaying the document will be explained in detail with reference to the flowchart of FIG. 18.

In step S1801, the display region calculation unit 104 calculates the display region R.

In step S1802, the scrolling information generation unit 105 initializes the scrolling information item U.

In step S1803, the extraction determination region calculation unit 1301 calculates the extraction determination region C. The extraction determination region C is defined, for example, by the width $C_w=R_w+k^0_w$ and the height $C_h=R_h+k^0_h$, where each of a fixed width $k^0_w$ and a fixed height $k^0_h$ is represented by a constant. For example, $k^0_w$ and $k^0_h$ may be a multiple of the width or height of the display region R, or may be an M multiple of a single scrolling amount. A single scrolling amount may be predetermined by a constant or determined in accordance with the previous scrolling speed of the user (or the average of the scrolling speed) as "$k^0_w=a \times v_{x\_avg}$," and "$k^0_h=b \times v_{y\_avg}$." By so doing, the scroll unit amount may be determined so that a larger extraction determination region C is set for a user whose scrolling speed is high, and keyword extraction is not frequently performed.

In step S1804, the extraction piece calculation unit 1302 calculates an extraction piece $I_i$. The shape of each of extraction pieces $I_0$ to $I_n$ is set to be the same as that of the corresponding extraction determination region C, and the extraction pieces are arranged like a grid as shown in FIG. 15. For a web page, the extraction piece $I_i$ may be determined for each block of HTML elements by analyzing the DOM tree structure, or may be determined for each web page.

In step S1805, the neighboring region calculation unit 106 initializes the neighboring region D. In the present embodiment, the neighboring region D includes two rectangular regions $D_0$ and $D_1$. As same as the first embodiment, the initialized neighboring region $D_0$ is the same as the display region R, and neighboring region $D_1$ is empty.

In step S1806, the extraction target region determination unit 1303 determines whether keyword extraction is performed for each extraction piece $I_i$. The operation of checking the extraction target region in step S1806 will be described later with reference to FIG. 19.

In step S1807, the scoring unit 107 updates the relative position (rx, ry) in the display region R for keywords w stored in the keyword information storage 1304. The relative position is calculated the same as in step S705 as shown in FIG. 7.

In step S1808, the scoring unit 107 updates the score of keyword. The operation in step S1808 will be described later with reference to FIG. 20.

Figure 19:
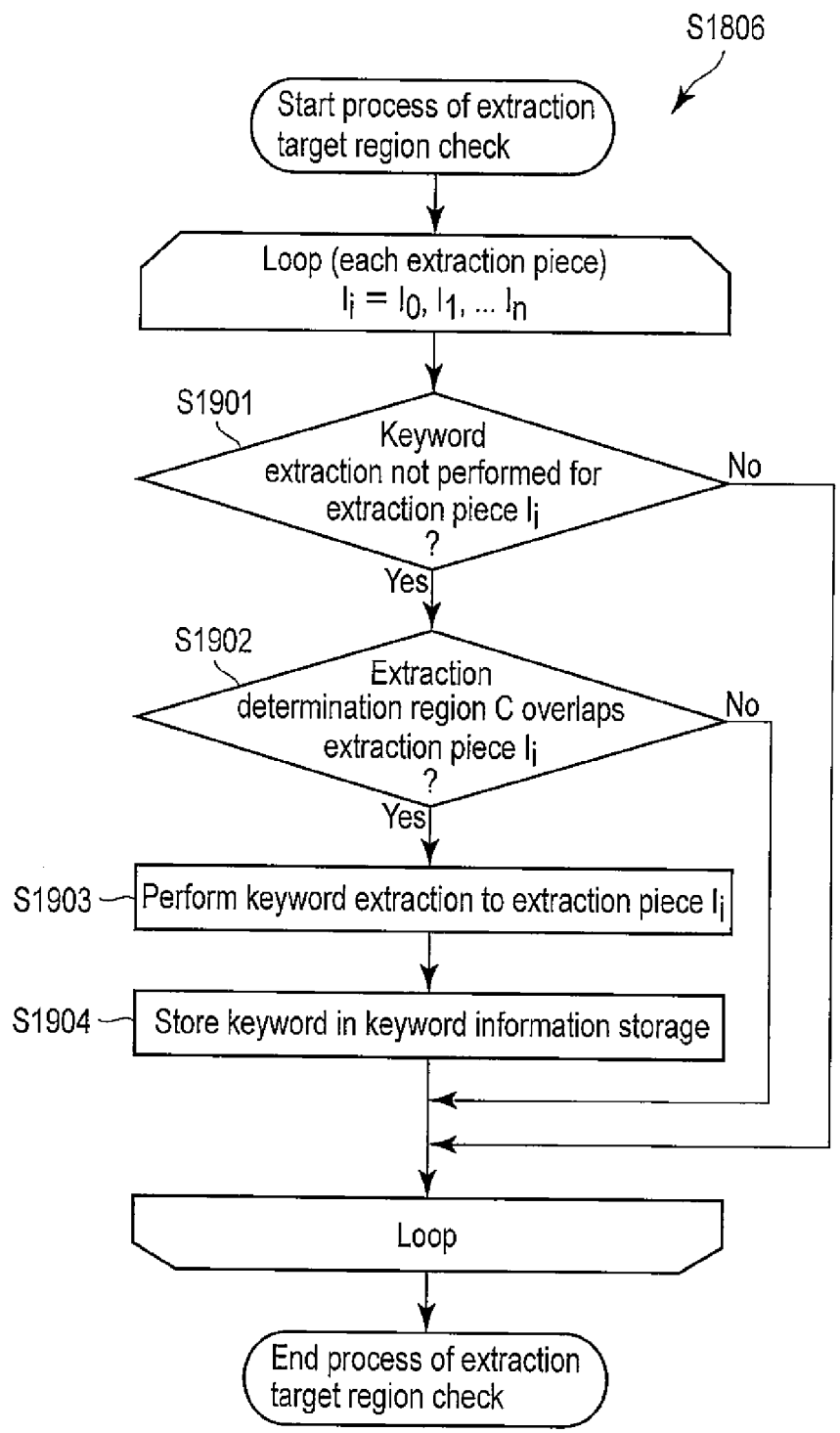
FIG. 19 is an exemplary flowchart illustrating the extraction target region checking operation.

The operation of checking the extraction target region in step S1806 will be described with reference to FIG. 19.

In step 1901, the extraction target region determination unit 1303 determines whether or not keyword extraction is performed for the extraction piece $I_i$. If keyword extraction has not been performed for the extraction piece $I_i$, step S1902 is executed. If keyword extraction has been performed for the extraction piece $I_i$, the operation to the extraction piece $I_i$ is terminated, and keyword extraction is performed for the next extraction piece $I_i$.

In step 1902, the extraction target region determination unit 1303 determines whether or not the extraction determination region C overlaps a part of the extraction piece $I_i$. If the extraction determination region C overlaps a part of the extraction piece $I_i$, step S1903 is executed. If the extraction piece $I_i$ does not overlap the extraction determination region C, the operation to the extraction piece $I_i$ is terminated, and keyword extraction is performed for the next extraction piece $I_i$.

In step S1903, the keyword extraction unit 103 performs keyword extraction to the extraction piece $I_i$. If a whole word or sentence is not included in the extraction piece, the extraction piece can be extended to some extent, for example, to include the whole word or sentence, or to include the whole HTML element for the web page.

In step S1904, the keyword extraction unit 103 stores a keyword extracted in step S1903 in the keyword information storage 1304. The relative position and score included in keyword information items are not defined since the extracted keyword is outside the display region R. Steps S1901 to S1904 are executed to each extraction piece $I_i=I_0, \ldots, I_n$. By the above process, keyword extraction is performed for the next extraction target unit.

Figure 20:
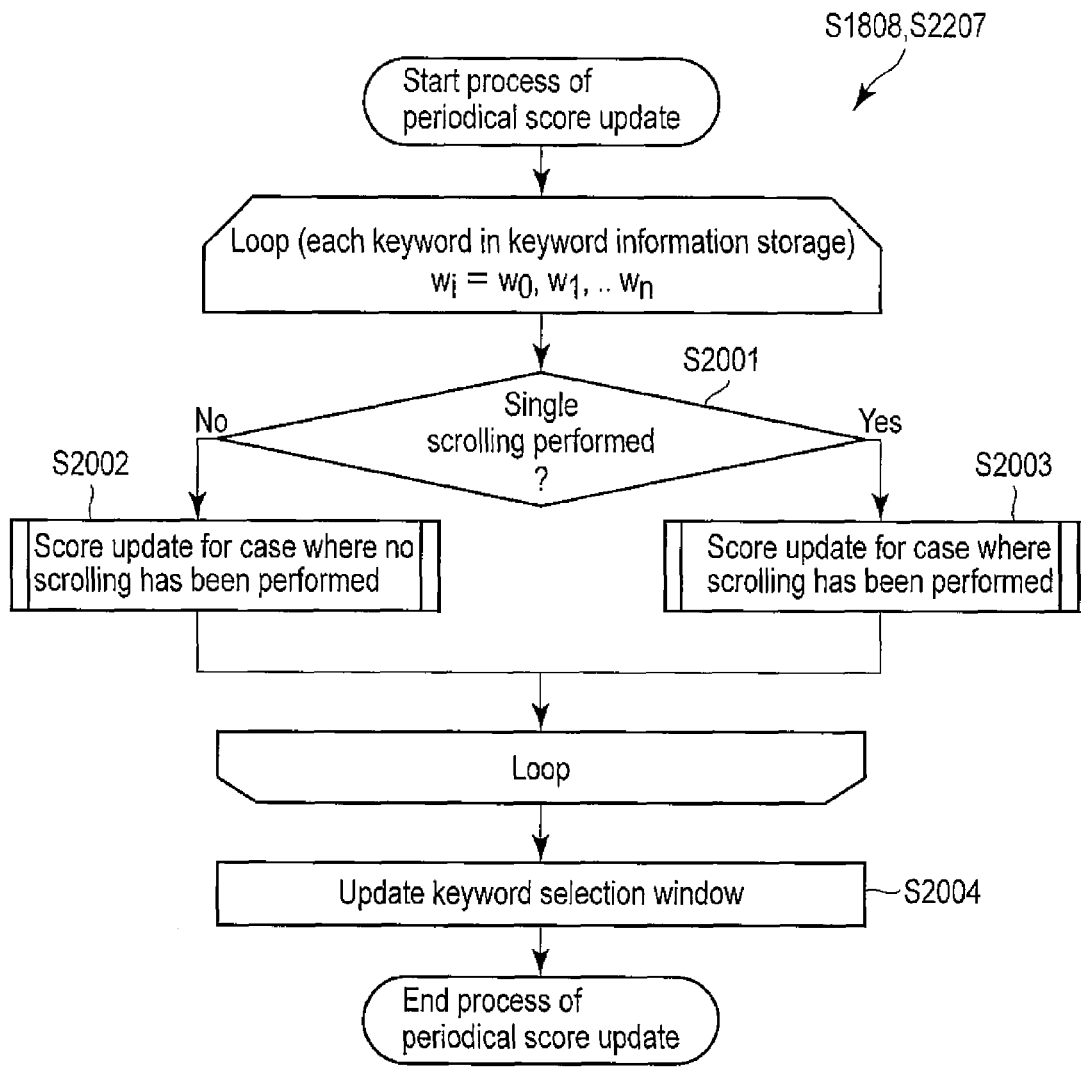
FIG. 20 is an exemplary flowchart illustrating the periodical score update operation.

The periodical score update of keyword will be explained in detail with reference to the flowchart of FIG. 20.

In step S2001, the scoring unit 107 determines whether a single scrolling has been performed by referring to the scrolling information item received from the scrolling information generation unit 105. If no scrolling has been performed, step S2002 is executed, if scrolling is performed at least once, step S2003 is executed. At the time of initially displaying the document, since no scrolling has been performed, step S2002 is executed.

In step S2002, the scoring unit 107 performs score update for the case where no scrolling has been performed. The operation in step S2002 will be described later with reference to FIG. 21.

In step S2003, the scoring unit 107 performs score update for the case where scrolling has been performed. The operation in step S2003 will be described later with reference to FIG. 24.

Steps S2001 to S2003 are executed for each keyword $w_i$.

In step S2004, the keyword selection window is updated based on the updated score for each keyword. The periodical score update process is completed.

Figure 21:
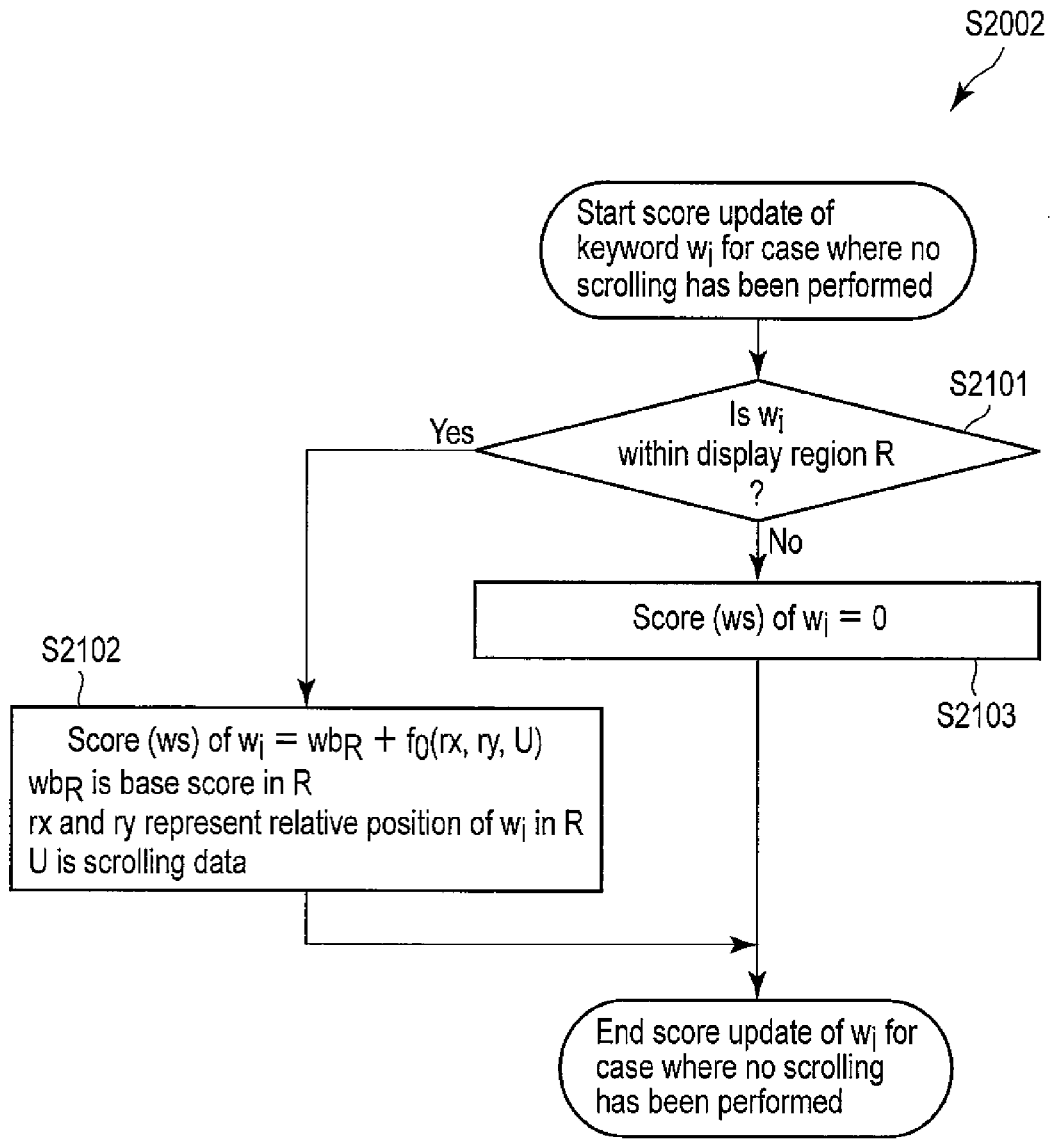
FIG. 21 is an exemplary flowchart illustrating the score update operation for the case where no scrolling has been performed.

The operation of score update by the scoring unit 107 for the case where no scrolling has been performed in step S2002 will be described in detail with reference to FIG. 21.

In step S2101, the scoring unit 107 determines whether the keyword $w_i$ is within the display region R. If the keyword $w_i$ is within the display region R, step S2102 is executed, and if not, step S2103 is executed.

In step S2102, the score of the keyword $w_i$ within the display region R is calculated. The score is given by $$ws = wb_R + f_0(rx, ry, U) \qquad (6)$$

where $wb_R$ represents the base score of the keyword $w_i$ within the display region R, (rx, ry) represents the relative position of the keyword $w_i$, and U represents the scrolling information item. Since if the elapsed time $t_d$ from the scroll time t indicated by the scrolling information item U is smaller than a threshold $t_{th}$, higher additional scores are assigned to keywords located in a higher portion of the display region R, $f_0$ (rx, ry, U) is given by $$f_0(rx, ry, U) = \begin{cases} (1 - t_d/t_{th}) \cdot a + t_d/t_{th} \cdot d & (ry < R_h/3) \\ (1 - t_d/t_{th}) \cdot b + t_d/t_{th} \cdot d & (R_h/3 \le ry \le 2 \cdot R_h/3) \\ (1 - t_d/t_{th}) \cdot c + t_d/t_{th} \cdot d & (2 \cdot R_h/3 < ry) \end{cases} \qquad (7)$$

$$(a > b > c > 0, d > 0).$$

If the elapsed time $t_d$ from the scroll time t indicated by the scrolling information item U is greater than or equal to the threshold $t_{th}$, the additional scores of all keywords are set to be the same, and $f_0$ equal to d. At the time of initially displaying the document, the elapsed time $t_d$ is zero which is smaller than the threshold $t_{th}$, higher additional scores are assigned to keywords located in a higher portion of the display region R as same as the first embodiment.

In step S2103, the score of the keyword $w_i$ is set to zero. The score update process for the case where no scrolling has been performed is completed.

Figure 22:
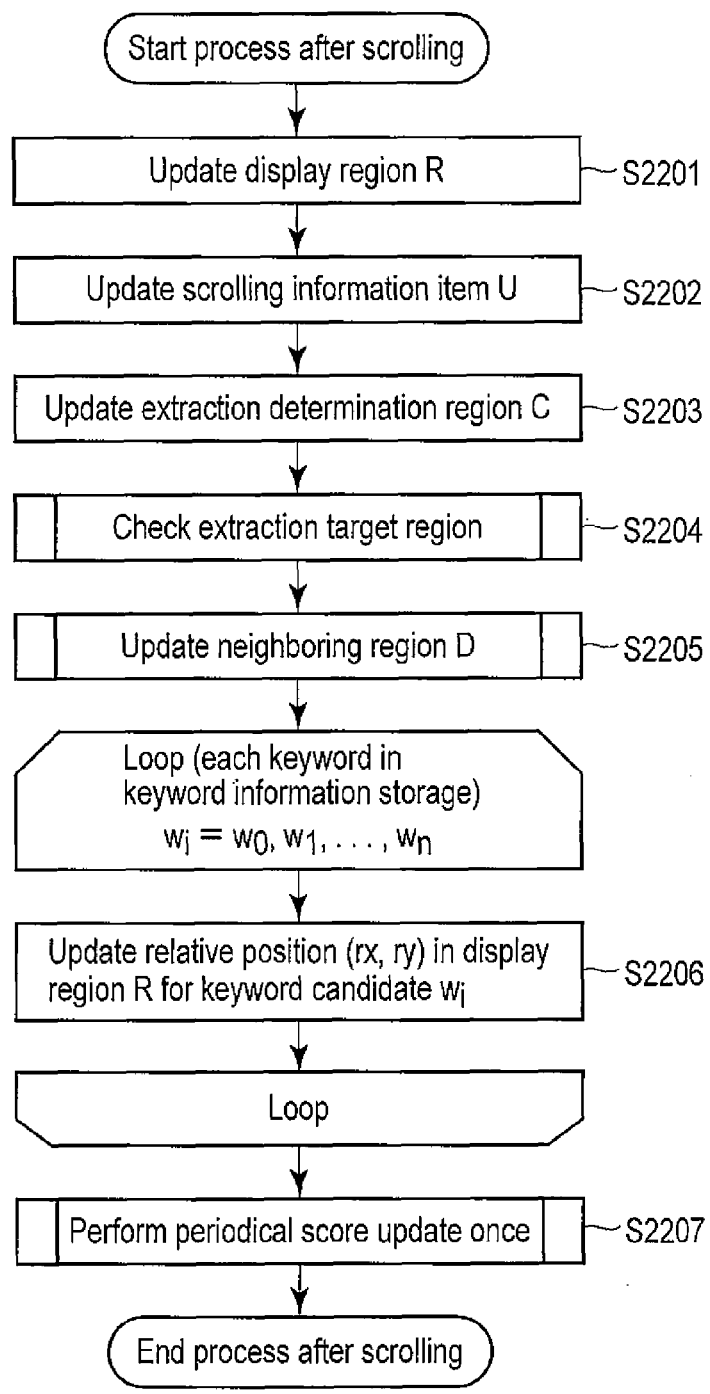
FIG. 22 is an exemplary flowchart illustrating the operation of the keyword extraction apparatus after scrolling according to the second embodiment.

The operation of the keyword extraction apparatus after scrolling has been performed according to the second embodiment will be described in detail with reference to the flowchart of FIG. 22.

In step S2201, the display region calculation unit 104 updates the display region R.

In step S2202, the scrolling information generation unit 105 updates the scrolling information item U.

In step S2203, the extraction determination region calculation unit 1301 updates the extraction determination region C. The size of the extraction determination region C may be the same as the initially set size or updated in accordance with the scrolling information item U. For example, the width $C_w$ and the height $C_h$ of the extraction determination region C are given by $$C_w = R_w + O_w + k^0_w + k_w$$

$$C_h = R_h + k^0_h + k_h \qquad (8)$$

where $(k_w, k_h) = (a \cdot |v_x|, b \cdot |v^y|)$.

Based on equation (8), if the scrolling speed is high, the extraction determination region C can be set to be large. The position of the extraction determination region C is defined by the central point $(C_{cx}, C_{cy}) = (C_x + C_w/2, C_y + C_h/2)$. The central point is given by $$C_{cx} = R_x + R_w/2 + b \cdot v_x$$

$$C_{cy} = R_y + R_h/2 + b \cdot v_y. \qquad (9)$$

The extraction determination region C is adjusted to include the display region R. By so doing, the extraction determination region C is updated to be a rectangular region including the display region R and a region which will be displayed by scrolling.

In step S2204, the same operation of checking the extraction target region as in step S1806 is performed. If necessary, the keyword extraction unit 103 performs keyword extraction for the next target extraction piece which will be displayed by scrolling.

In step S2205, the neighboring region calculation unit 106 updates the neighboring region D. The operation in step S2205 will be described later with reference to FIG. 23.

Figure 8:
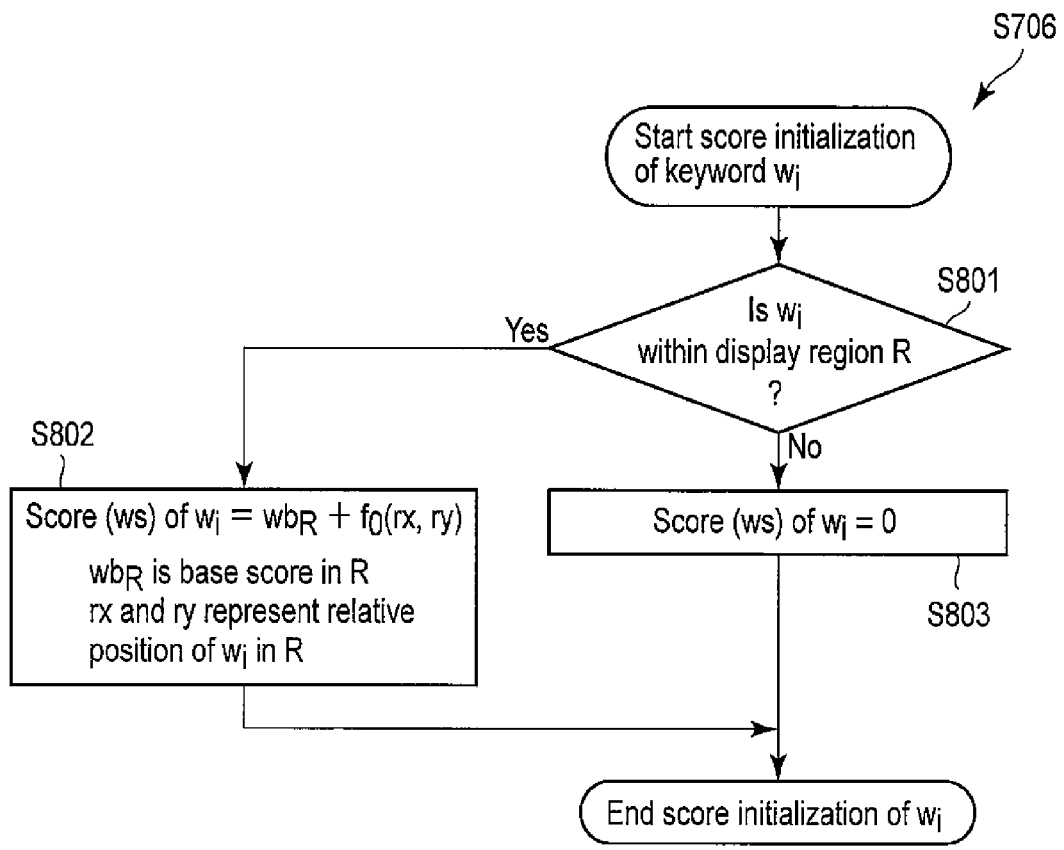
FIG. 8 is an exemplary flowchart illustrating the calculation of the initial score.

In step S2206, the scoring unit 107 updates the relative position (rx, ry) in the display region R for each keyword $w_i$ stored in the keyword information storage 1304 the same as in step S1807 shown in FIG. 8.

In step S2207, the scoring unit 107 updates the scores of keywords. The operation in step S2207 will be described later with reference to FIG. 24. The above steps are executed after scrolling. Steps S2201 to S2207 are executed every time scrolling is performed.

Figure 23:
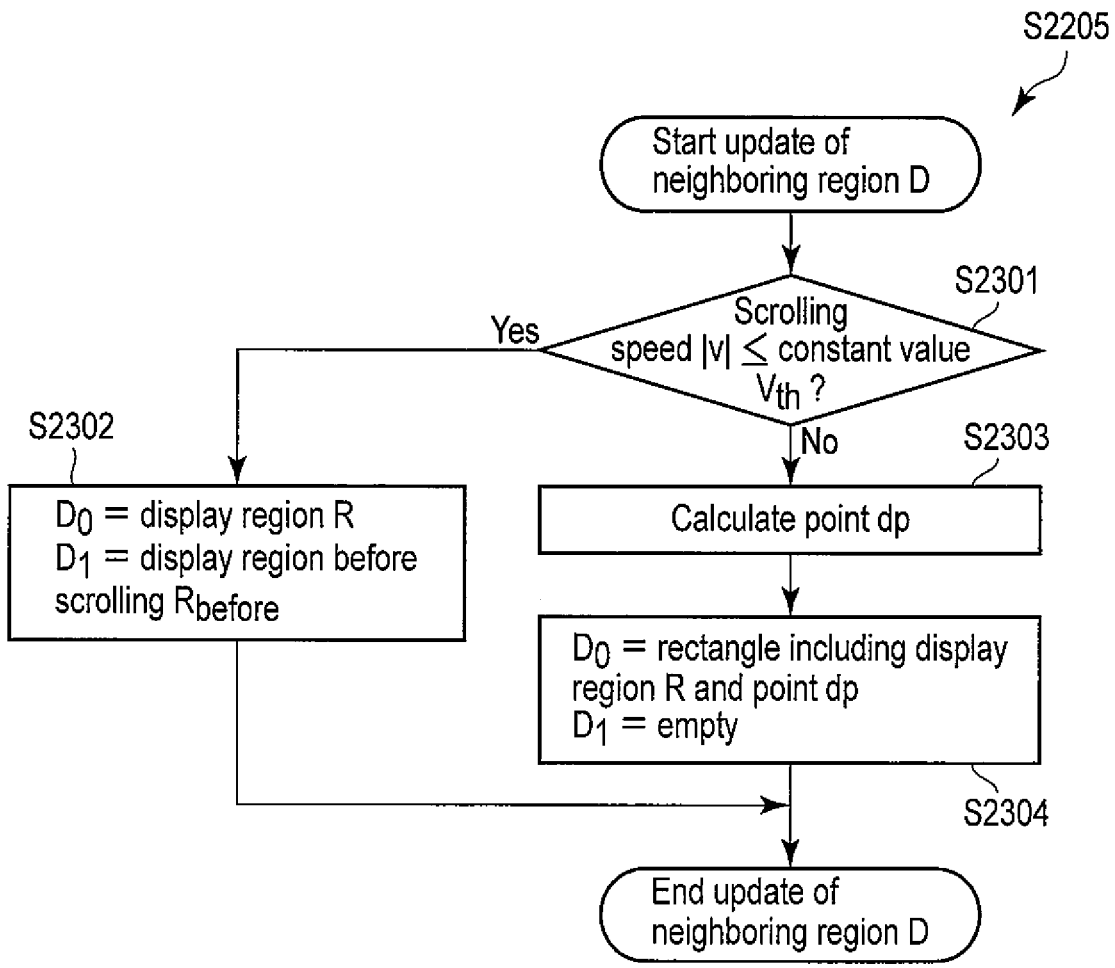
FIG. 23 is an exemplary flowchart illustrating the update operation of neighboring region.

The operation of updating the neighboring region D by the neighboring region calculation unit 106 in step S2205 will be described in detail with reference to the flowchart of FIG. 23. The neighboring region D is set not to include the region scrolled if the scrolling speed v is high, and is set to include the region a little above the current display region R if the scrolling speed v is low.

In step S2301, the scoring unit 107 determines whether or not the absolute value of the scrolling speed v indicated by the scrolling information item U is greater than or equal to a predetermined value $V_{th}$. If the absolute value of the scrolling speed v indicated by the scrolling information item is greater than or equal to the predetermined value $V_{th}$, step S2302 is executed, and if not, step S2303 is executed.

In step S2302, if the absolute value of the scrolling speed v indicated by the scrolling information item U is greater than or equal to a predetermined value $V_{th}$, $D_0$ is set to be the same as the display region R, and $D_1$ is set to be the same as the display region before scrolling $R_{before}$. The region between the display region R and the display region before scrolling $R_{before}$ is not included in the neighboring region D. This avoids displaying keywords included in the part that the user does not view intentionally.

In step S2303, the point dp for the case where the absolute value of the scrolling speed v is less than the predetermined value $v_{th}$ is given by $$(dp_x, dp_y) = (R_x + R_w/2 - d \cdot v_x, R_y + R_h/2 - d \cdot v_y), \qquad (10)$$

where d>length of diagonal of R/2, so that d is not included in the display region R.

In step S2304, for neighboring region $D_0$, the display region R is expanded to include the point dp, and D1 is set to be empty. By expanding the display region R to include the point dp, the scrolled region a little above the current display region R can be included in the neighboring region D. For example, the neighboring region D is obtained by calculating $D_0$ and $D_1$ which are given by $$D_{0x} = \min(R_x, dp_x)$$

$$D_{0y} = \min(R_y, dp_y)$$

$$D_{0w} = \max(R_x + R_w - D_{0x}, dp_x - D_{0x})$$

$$D_{0h} = \max(R_y + R_h - D_{0y}, dp_y - D_{0y})$$

$$D_1 = \text{Empty}. \tag{11}$$

The operation of updating the neighboring region D is completed in the above process.

Figure 24:
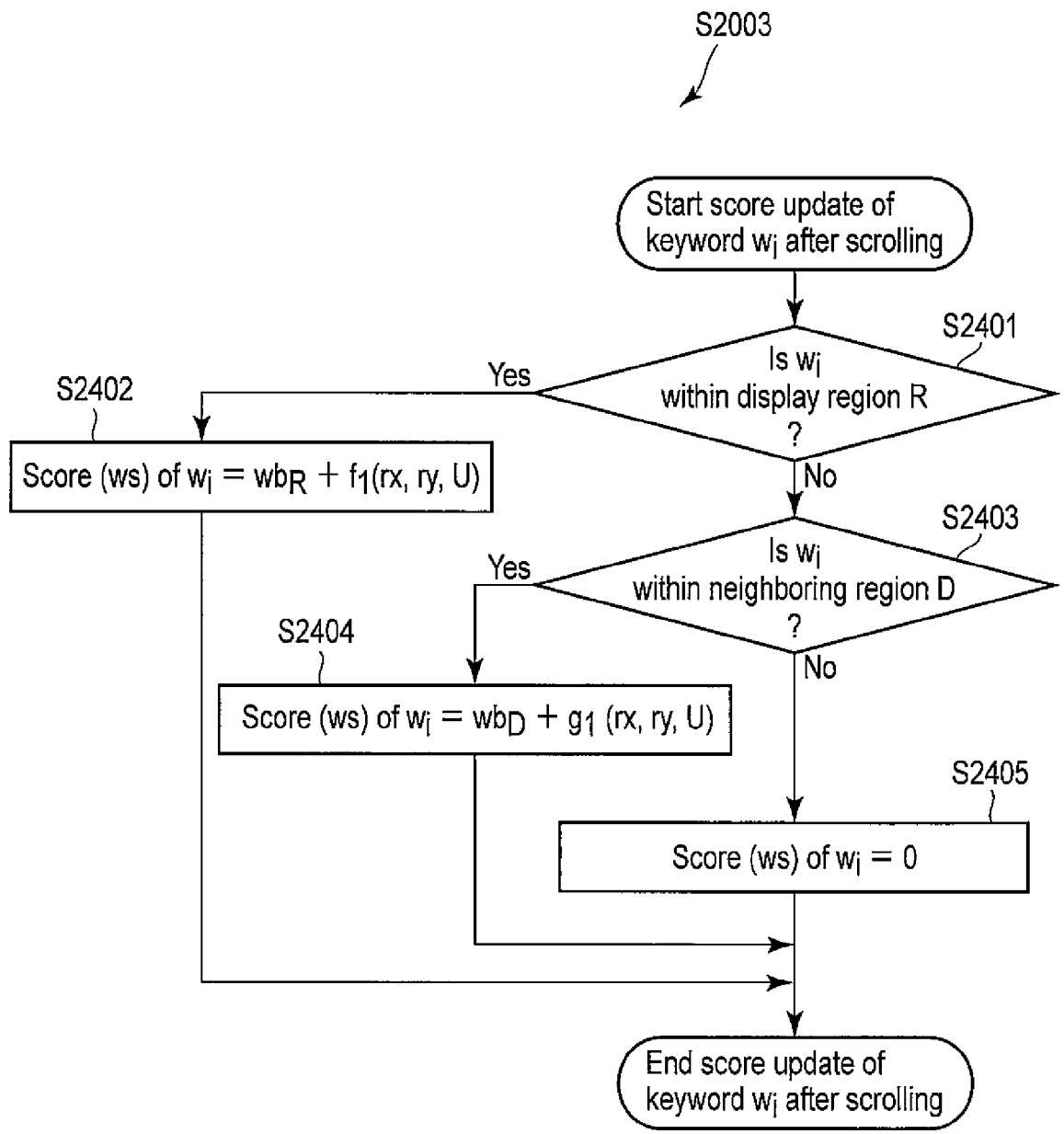
FIG. 24 is an exemplary flowchart illustrating the score update operation after scrolling.

The operation of score update after scrolling in step S2003 will be described in detail with reference to FIG. 24. The operation is the same as in steps S1001 to S1005 shown in FIG. 10. The operation will be explained assuming that the direction of scrolling is limited to vertical for simplification. However, scoring can be performed in horizontal or diagonal scrolling in the same manner.

In step S2401, the scoring unit 107 determines whether or not the keyword $w_i$ is within the display region R. If the keyword $w_i$ is within the display region R, step S2402 is executed. If $w_i$ is not within the display region R, step S2403 is executed.

In step S2402, the scoring unit 107 calculates the updated score of the keyword $w_i$. The updated score ws is given by $$ws = wb_R + f_1(rx, ry, U). \tag{12}$$

If the elapsed time $t_d$ from the scroll time t indicated by the scrolling information item U is smaller than the threshold $t_{th}$, $f_1$ (rx, ry, U) is given by $$f_1(rx, ry, U) = \begin{cases} (1 - t_d/t_{th}) \cdot a + t_d/t_{th} \cdot d & (ry < R_h/3) \\ (1 - t_d/t_{th}) \cdot b + t_d/t_{th} \cdot d & (R_h/3 \le ry \le 2 \cdot R_h/3) \\ (1 - t_d/t_{th}) \cdot c + t_d/t_{th} \cdot d & (2 \cdot R_h/3 < ry) \end{cases} \tag{13}$$

$$(c > b > a > 0, d > 0).$$

If the elapsed time $t_d$ is greater than the threshold $t_{th}$, $f_1 = d$. At the time of scrolling, since $t_d = 0$, higher additional scores are assigned to keywords located in a lower portion of the display region R, in the same way as the first embodiment.

In step S2403, the scoring unit 107 determines whether the keyword $w_i$ is outside the display region R but within the neighboring region D. If the keyword $w_i$ is within the neighboring region D, step S2404 is executed. If the keyword $w_i$ is not within the neighboring region D, step S2405 is executed.

In step S2404, the updated score ws of a keyword within the neighboring region D is given by $$ws = wb_D + g_1(rx, ry, U). \tag{14}$$

If the elapsed time $t_d$ from the scroll time t indicated by the scrolling information item U is smaller than the threshold $t_{th}$, $g_1$ (rx, ry, U) is given by $$g_1(rx, ry, U) = \begin{cases} (1 - t_d/t_{th}) \cdot d + t_d/t_{th} \cdot a & (|ry| < R_h/3) \\ (1 - t_d/t_{th}) \cdot d + t_d/t_{th} \cdot b & (R_h/3 \le |ry| \le 2 \cdot R_h/3) \\ (1 - t_d/t_{th}) \cdot d + t_d/t_{th} \cdot c & (2 \cdot R_h/3 < |ry|) \end{cases} \tag{15}$$

$$(a > b > c > 0, d > 0).$$

If the elapsed time $t_d$ is greater than the threshold $t_{th}$, $g_1$ (rx, ry, U) is given by $$g_1(rx, ry, U) = \begin{cases} a & (|ry| < R_h/3) \\ b & (R_h/3 \le |ry| \le 2 \cdot R_h/3) \\ c & (2 \cdot R_h/3 < |ry|) \end{cases} \tag{16}$$

$$(a > b > c > 0).$$

At the time of scrolling, since $t_d = 0$, the same score is added to each keyword within the neighboring region.

In step S2405, the updated score of the keyword $w_i$ which is not within the display region R or the neighboring region D is set to zero. The score update after scrolling is completed.

The score is periodically updated by using a timer, for example, other than at the time of initially displaying the document or scrolling the document. For example, the updated score ws of the keyword $w_i$ shown within the neighboring region D becomes larger as the elapsed time $t_d$ after scrolling becomes larger as shown in equation (13). Accordingly, higher additional scores are assigned to keywords in the neighboring region D closer to the display region R.

Figure 25A:
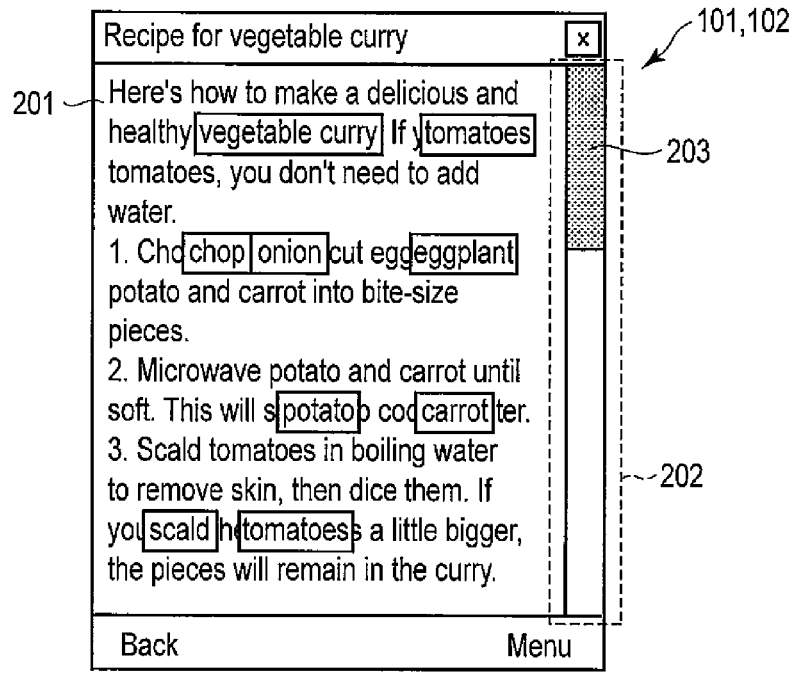
FIG. 25A illustrates an example of the keyword selection window at the time of initially displaying the document according to the second embodiment.

An example of keyword selection window generated based on the updated keyword scores will be explained in detail with reference to FIGS. 25A to 25C.

Without the user's operation, keywords shown in the neighboring region D change as time has elapsed. Concretely, FIG. 25A shows the initial page view. Keywords extracted within the display region R are highlighted.

Figure 25B:
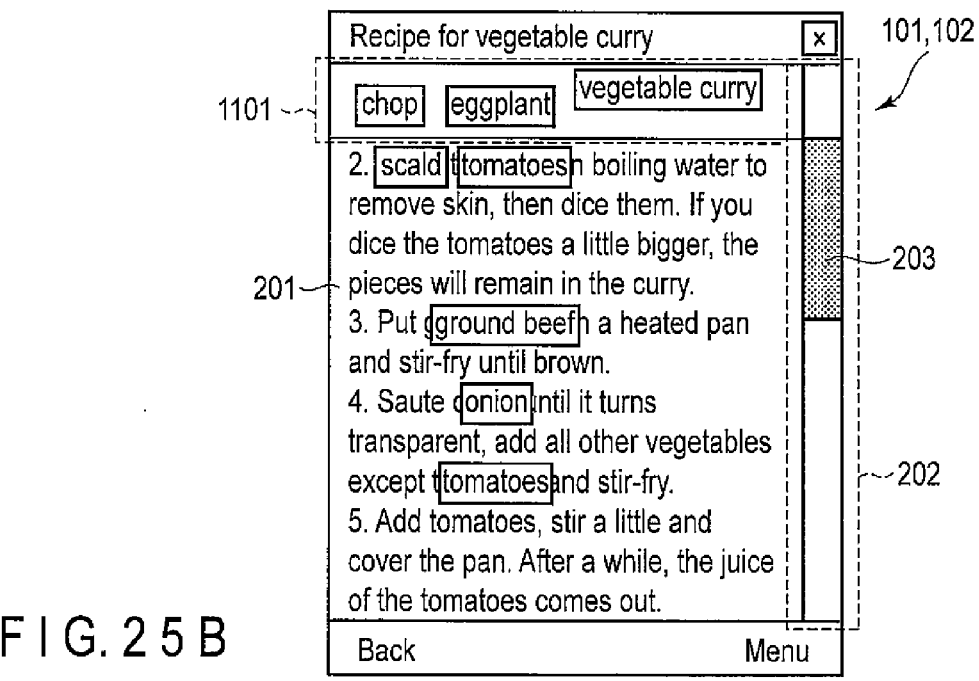
FIG. 25B illustrates an example of the keyword selection window right after scrolling.

FIG. 25B shows the window right after scrolling. In the neighboring keyword display region 1101, "chop," "eggplant" and "vegetable curry" are displayed as keywords.

Figure 25C:
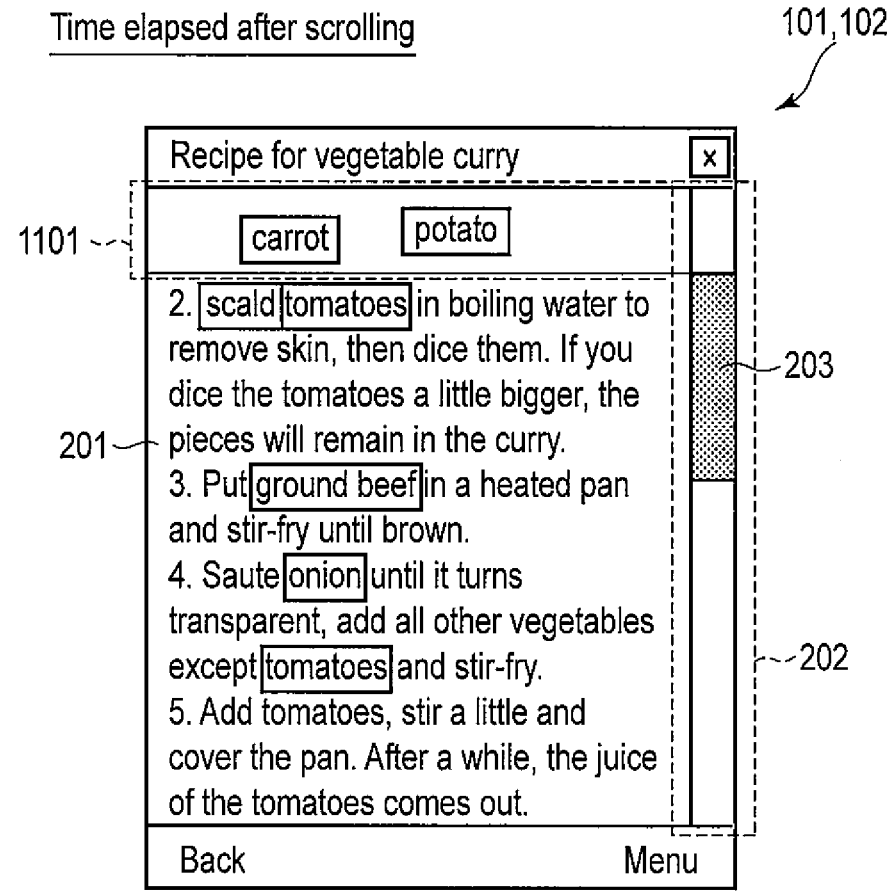
FIG. 25C illustrates an example of the keyword selection window when a predetermined time has elapsed after scrolling.

FIG. 25C shows the window at the time when a predetermined time has elapsed after scrolling. The scores for "chop," "eggplant" and "vegetable curry" which are located away in the y-axis from the display region R are set to be low. The scores of keywords "carrot" and "potato" which are within the neighboring region D and closer to the display region R are updated to be high, and these keywords are displayed in the neighboring keyword display region 1101.

According to the second embodiment, keyword extraction is performed only to the required region. This reduces time required to become ready for the user's keyword selection even for a large document. In the second embodiment, the scrolling information item includes time data to change the scores of keywords according to the elapsed time after scrolling. This realizes keyword extraction in accordance with each user's scrolling amount, and the user can easily select a desired keyword while browsing the document.

The flowcharts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A keyword extraction apparatus, comprising:
a display configured to display a document;
a first calculation unit configured to calculate a partial region indicating a part of the document displayed in the display;
a scroll unit configured to scroll the document to display other than the partial region;
a first generation unit configured to generate scrolling information item including a first position of a first display region and a second position of a second display region, the first display region being displayed before the scrolling, the second display region being to be displayed after the scrolling;
an extraction unit configured to extract one or more keywords in the document;
a scoring unit configured to calculate scores of the keywords in accordance with positions that the keywords occur within the document; and
a second generation unit configured to generate a window for selecting at least one of the keywords in descending order of the scores from first keywords, occurring within a neighboring region, based on the scrolling information item.

2. The apparatus according to claim 1, further comprising a second calculation unit configured to calculate the neighboring region including the first display region and the second display region.

3. The apparatus according to claim 1, further comprising a search unit configured to search an external information source for the keywords.

4. The apparatus according to claim 1, wherein the extraction unit extracts the keywords occurring within the first display region and the second display region.

5. The apparatus according to claim 1, wherein
the scoring unit sets first base scores which are initial values of second keywords to be higher than second base scores which are initial values of third keywords, the second keywords occurring within the second display region, the third keywords occurring outside the second display region and occurring within the neighboring region, the second keywords and the third keywords being both included in the keywords,
adds first additional scores to the first base scores so that higher scores are assigned to the second keywords located in higher positions of the second display region, at a time of initially displaying the document, and
adds second additional scores to the first base scores so that higher scores are assigned to the second keywords located in lower positions of the second display region and adds third additional scores to the second base scores so that higher scores are assigned to the third keywords located closer to the second display region, after scrolling the document.

6. The apparatus according to claim 1, further comprising:
a third calculation unit configured to calculate a plurality of first extraction pieces obtained by dividing the document into at least two regions;
a fourth calculation unit configured to calculate an extraction determination region which is larger than the second display region; and a determination unit configured to determine whether or not the extraction determination region overlaps a part of at least one of second extraction pieces, the second extraction pieces each indicating one of the first extraction pieces which has failed to extract the keywords,
wherein if the determination unit determines that the extraction determination region overlaps the part, the extraction unit extracts the keywords from each of the overlapped second extraction pieces.

7. The apparatus according to claim 6, wherein the scrolling information item further includes an elapsed time after scrolling and a scrolling speed.

8. The apparatus according to claim 6, wherein
the scoring unit sets first base scores of second keywords to be higher than second base scores of the third keywords, the second keywords occurring within the second display region, the third keywords occurring outside the second display region and occurring within the neighboring region, the second keywords and the third keywords being both included in the keywords,
adds first additional scores to the first base scores so that higher scores are assigned to the second keywords located in higher positions of the second display region, until a time has elapsed after initially displaying the document, and adds second additional scores to the first base scores so that the scores of the second keywords become equal to each other after the time has elapsed after initially displaying the document, and,
adds third additional scores to the first base scores so that higher scores are assigned to the second keywords located in lower positions of the second display region, and adds fourth additional scores to the second base scores so that the fourth additional scores of the third keywords become equal to each other until the time has elapsed after scrolling the document, and adds fifth additional scores to the first base scores so that the scores of the second keywords become equal to each other, and adds sixth additional scores to the second base scores so that higher scores are assigned to the third keywords located closer to the second display region, after the time has elapsed after scrolling the document.

9. The apparatus according to claim 7, wherein the fourth calculation unit expands the extraction determination region as the scrolling speed increases.

10. The apparatus according to claim 8, further comprising a fifth calculation unit configured to calculate conspicuity value for a keyword, the conspicuity value being an index indicating how eye-catching the keyword is based on characteristics on design including at least one of a text color, a background color and a font size,
wherein the scoring unit adds the conspicuity value to either the first base scores or the second base scores.

11. The apparatus according to claim 8, further comprising a control unit configured to calculate a scroll characteristic of a user, based on position information item of a target keyword selected by the user within the second display region and the scrolling speed until the user selects the target keyword,
wherein the scoring unit sets eighth additional scores of the third keywords in accordance with the position of each of the keywords within the second display region based on the scrolling speed, and adds the eighth additional scores to the first base scores or the second base scores.

12. A non-transitory computer readable medium including computer executable instructions, wherein the instructions, when executed by a processor, cause the processor to perform a method comprising:

displaying a document on a display;

calculating a partial region indicating a part of the document displayed in the display;

scrolling the document to display other than the partial region;

generating scrolling information item including a first position information item of a first display region and a second position information item of a second display region, the first display region being displayed before the scrolling, the second display region being to be displayed after the scrolling;

extracting one or more keywords in the document;

calculating scores of the keywords in accordance with positions that the keywords occur within the document; and generating one or more windows for selecting at least one of the keywords in descending order of the scores from first keywords, occurring within a neighboring region based on the scrolling information item.

\* \* \* \* \*